(12) United States Patent
Kaneda

(10) Patent No.: US 7,986,605 B2
(45) Date of Patent: Jul. 26, 2011

(54) OPTICAL PICKUP AND OPTICAL DISC APPARATUS USING THE SAME

(75) Inventor: Kazumasa Kaneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 184 days.

(21) Appl. No.: 12/494,684

(22) Filed: Jun. 30, 2009

(65) Prior Publication Data
US 2010/0002562 A1 Jan. 7, 2010

(30) Foreign Application Priority Data
Jul. 4, 2008 (JP) ................................. 2008-176049

(51) Int. Cl.
*G11B 7/00* (2006.01)
(52) U.S. Cl. ......... 369/112.03; 369/112.05; 369/112.23; 359/571; 359/573; 359/574; 359/575; 359/719
(58) Field of Classification Search ............. 369/112.01, 369/112.03, 112.05, 112.23; 359/566, 570–575, 359/719
See application file for complete search history.

(56) References Cited

U.S. PATENT DOCUMENTS

| | | | | |
|---|---|---|---|---|
| 7,012,876 B2 * | 3/2006 | Hendriks et al. | ......... | 369/112.24 |
| 7,133,332 B2 * | 11/2006 | Kimura | ....................... | 369/44.32 |
| 7,164,625 B2 * | 1/2007 | Arai et al. | ................... | 369/44.23 |
| 7,440,381 B2 * | 10/2008 | Kimura et al. | ........... | 369/112.01 |
| 7,515,523 B2 * | 4/2009 | Kimura et al. | ........... | 369/112.07 |
| 2002/0122374 A1 | 9/2002 | Yamamoto et al. | | |
| 2003/0179683 A1 * | 9/2003 | Hendriks et al. | .............. | 369/125 |
| 2004/0213131 A1 * | 10/2004 | Kimura et al. | ........... | 369/112.03 |
| 2004/0264349 A1 * | 12/2004 | Kimura et al. | ........... | 369/112.07 |
| 2005/0105446 A1 | 5/2005 | Sakamoto et al. | | |
| 2006/0146422 A1 * | 7/2006 | Koike | ............................ | 359/742 |
| 2009/0231984 A1 * | 9/2009 | Hotta et al. | .............. | 369/112.23 |
| 2009/0316543 A1 | 12/2009 | Hayashibe et al. | | |
| 2010/0002562 A1 * | 1/2010 | Kaneda | ..................... | 369/112.23 |
| 2010/0008200 A1 | 1/2010 | Ogihara | | |
| 2010/0054109 A1 | 3/2010 | Yasui | | |
| 2010/0085861 A1 * | 4/2010 | Boots et al. | .............. | 369/112.23 |
| 2010/0128592 A1 * | 5/2010 | Kimura | ..................... | 369/112.23 |

FOREIGN PATENT DOCUMENTS
JP     9-312057 A     12/1997
(Continued)

*Primary Examiner* — Wayne R Young
*Assistant Examiner* — Brenda Bernardi
(74) *Attorney, Agent, or Firm* — Wolf, Greenfield & Sacks, P.C.

(57) ABSTRACT

An optical pickup includes a light source emitting a light beam, an objective lens condensing the light beam emitted from the light source onto an optical disc, at least one divergent angle conversion lens (collimator lens) disposed between the light source and the objective lens and changing a divergent angle of the incident light beam, a driving unit (collimator lens driving mechanism) configured to drive the divergent angle conversion lens in a direction of an optical axis, an optical detection device (optical detector) detecting a return light beam reflected at the optical disc, and an environmental change detecting unit (temperature sensor) configured to detect change in environmental temperature, wherein the objective lens is made of a refractive element having, on one surface thereof, a diffraction structure in a stepped shape or a blazed sectional shape, which generates diffraction light providing a spot adapted to perform satisfactory recording and/or reproducing, the objective lens satisfying certain relationships among an amount of wavefront aberration thereof corresponding to change in environmental temperature, an amount of the change in environmental temperature, and a focal length.

6 Claims, 13 Drawing Sheets

FOREIGN PATENT DOCUMENTS

| | | |
|---|---|---|
| JP | 11-219542 A | 8/1999 |
| JP | 11-353785 A | 12/1999 |
| JP | 2001-143301 A | 5/2001 |
| JP | 2001-357557 A | 12/2001 |
| JP | 2002-329316 A | 11/2002 |
| JP | 2003-157545 A | 5/2003 |
| JP | 2004-265573 A | 9/2004 |
| JP | 2005-018967 A | 1/2005 |
| JP | 2005-037658 A | 2/2005 |
| JP | 2005-209325 A | 8/2005 |
| JP | 2005-259332 A | 9/2005 |
| JP | 2005-327328 A | 11/2005 |
| JP | 2005-353142 A | 12/2005 |
| JP | 2006-107734 A | 4/2006 |
| JP | 2006-185498 A | 7/2006 |
| JP | 2006-309809 A | 11/2006 |
| JP | 2007-004962 A | 1/2007 |
| JP | 2007-122851 A | 5/2007 |
| JP | 2007-294029 A | 11/2007 |
| JP | 2007-328886 A | 12/2007 |
| JP | 2008-004169 | 1/2008 |
| JP | 2008-071433 A | 3/2008 |
| WO | WO 2008/010506 A1 | 1/2008 |

* cited by examiner

OPTICAL PICKUP AND OPTICAL DISC APPARATUS USING THE SAME

BACKGROUND OF THE INVENTION

1. Field of the Invention

The present invention relates to an optical pickup for recording and/or reproducing an information signal with respect to an optical disc, and also relates to an optical disc apparatus using the optical pickup.

2. Description of the Related Art

In optical pickups for recording and/or reproducing information signals with respect to optical discs, it has recently been proposed to use an objective lens as a component of the optical pickup, which is in the form of a plastic lens and a single lens, for the purposes of reducing the overall weight and the production cost.

Also, an optical disc has recently been used which enables information signals to be recorded at a higher density than in ordinary optical discs, e.g., a CD (Compact Disc) or a DVD (Digital Versatile Disc). For example, there is a BD (Blu-ray Disc (registered trademark)) in which signals are recorded and/or reproduced by using a light (optical) beam emitted from a violet semiconductor laser and having a wavelength of about 405 nm.

As in the optical pickup for the DVD and the CD, using a plastic lens as an objective lens is also desired in an optical pickup for use with such a high-density recording optical disc, e.g., the BD. However, because the plastic lens exhibits a larger variation in refractivity depending on temperature change than a glass lens, larger spherical aberration is generated in the plastic lens due to the temperature change. Particularly, when the lens has a high numerical aperture (NA) of about 0.85 as in the optical pickup for the BD, spherical aberration is generated to such an extent as greatly affecting the focusing performance of the lens even with a slight temperature change of about several degrees.

One of general methods for correcting the spherical aberration generated due to temperature change is to provide a diffraction structure on the surface of an objective lens, and generating spherical aberration in polarity opposed to that of the spherical aberration generated due to temperature change, thus canceling the latter spherical aberration. However, application of great diffraction power is necessary in order to completely correct the spherical aberration generated due to temperature change. This gives rise to a problem that the diffraction structure becomes so fine and a difficulty occurs in forming the diffraction structure. Another problem is that the necessity of machining a fine structure raises a difficulty in obtaining satisfactory light utilization efficiency due to incomplete cutting (generation of an uncut portion) of a mold.

Another conceivable method for correcting the spherical aberration generated due to temperature change is to drive a collimator lens in the direction of an optical axis so as to cancel the spherical aberration generated due to temperature change by spherical aberration of magnification (see Japanese Unexamined Patent Application Publication No. 2008-4169). This method is, however, contradictory to the intention to reduce the weight of optical pickup for the reason that the driving stroke of the collimator lens is very large and the size of an optical pickup is increased.

Further, the driving stroke of the collimator lens can be reduced by forming a divergent angle conversion lens as a two-element lens to increase sensitivity in generation of the spherical aberration that is generated with the lens driving in the direction of the optical axis, and to reduce the driving stroke of the collimator lens. However, this method increases the number of lenses and is contradictory to the intention to suppress the production cost.

The above-described methods additionally employ, in common, a system which monitors temperature and drives the lens depending on temperature change. Such a system, however, has a difficulty in executing accurate feedback system control because the sensitivity in generation of the spherical aberration is too high in view of executing the correction corresponding to the generated spherical aberration.

Further, the large spherical aberration generated due to temperature change includes spherical aberration components of fifth or higher orders, which are generated at rates different from higher-order components included in the spherical aberration of magnification generated with the lens driving. This results in a difficulty in completely canceling the spherical aberration components of fifth or higher orders.

SUMMARY OF THE INVENTION

There is a need for an optical pickup and an optical disc apparatus, which can reduce aberration generated due to change in environmental temperature and which can realize satisfactory recording and reproducing.

According to one embodiment of the present invention, an optical pickup includes a light source emitting a light beam, an objective lens condensing the light beam emitted from the light source onto an optical disc, at least one divergent angle conversion lens disposed between the light source and the objective lens and changing a divergent angle of the incident light beam, driving means for driving the divergent angle conversion lens in a direction of an optical axis, an optical detection device detecting a return light beam reflected at the optical disc, and an environmental change detecting unit configured to detect change in environmental temperature, wherein the objective lens is made of a refractive element having, on one surface thereof, a diffraction structure in a stepped shape or a blazed sectional shape, which generates diffraction light for providing a spot adapted to perform satisfactory recording and/or reproducing, the objective lens satisfying a relationship of $2.5 \times 10^{-3} \leq \Delta WFA/(\Delta T \times f) \leq 2.6 \times 10^{-3}$ when first-order light is used, a relationship of $1.8 \times 10^{-3} \leq \Delta WFA/(\Delta T \times f) \leq 2.6 \times 10^{-3}$ when second-order light is used, a relationship of $1.1 \times 10^{-3} \leq \Delta WFA/(\Delta T \times f) \leq 2.6 \times 10^{-3}$ when third-order light is used, a relationship of $0.7 \times 10^{-3} \leq \Delta WFA/(\Delta T \times f) \leq 2.6 \times 10^{-3}$ when fourth-order light is used, and a relationship of $0.2 \times 10^{-3} \leq \Delta WFA/(\Delta T \times f) \leq 2.6 \times 10^{-3}$ when fifth-order light is used ($\Delta WFA$ denotes an amount of wavefront aberration of the objective lens corresponding to change in environmental temperature, $\Delta T$ denotes an amount of the change in environmental temperature, and f denotes a focal length of the objective lens), and wherein the divergent angle conversion lens is driven step by step in accordance with a detection result of the environmental change detecting unit.

According to another embodiment of the present invention, an optical disc apparatus includes an optical pickup recording and/or reproducing an information signal with respect to an optical disc which is driven for rotation, the optical pickup in the optical disc apparatus being constructed as described above.

According to the embodiments of the present invention, even when the environmental temperature is changed, generation of spherical aberration can be suppressed and optical characteristics can be maintained by cooperation of the predetermined diffraction structure formed on one surface of the objective lens with the driving of the divergent angle conversion lens depending on the detection result of the environmental change detecting unit. According to the embodiments of the present invention, therefore, the objective lens can be made of plastic, for example, and the driving stroke of the divergent angle conversion lens can be reduced. As a result, recording and reproducing characteristics can be maintained, a reduction in size and weight of the apparatus can be realized, and the apparatus construction can be simplified. Further, according to the embodiments of the present invention, satisfactory recording and reproducing characteristics are realized by reducing the aberration generated due to change in environmental temperature.

BRIEF DESCRIPTION OF THE DRAWINGS

FIG. 3A is a sectional view of the objective lens, and FIG. 3B is a plan view illustrating the side of the objective lens, which includes the diffraction structure;

FIG. 5A is a graph showing a design phase amount $\phi$ that is to be applied to a design wavelength $\lambda_o$ for each position in the radial direction, FIG. 5B is a graph showing a phase amount $\phi'$ that is actually applied to each position in the radial direction based on $\phi$ plotted in FIG. 5A, and FIG. 5C is a graph conceptually showing a shape of the diffraction structure to which the phase amount $\phi'$ shown in FIG. 5B is applied;

DESCRIPTION OF THE PREFERRED EMBODIMENTS

An optical pickup and an optical disc apparatus according to an embodiment of the present invention will be described in detail with reference to the drawings.

Figure 1:
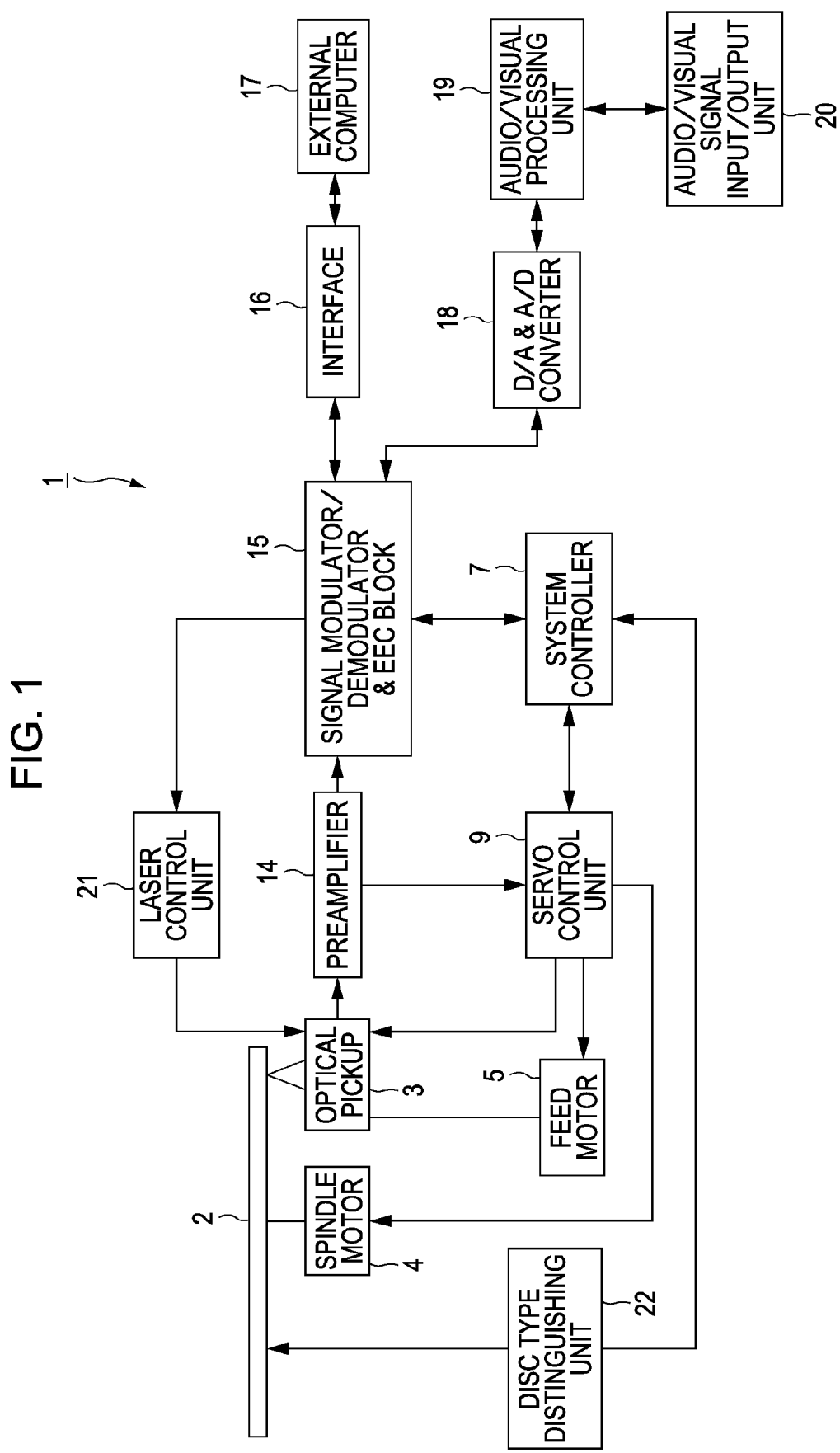
FIG. 1 is a circuit block diagram illustrating the configuration of an optical disc apparatus according to an embodiment of the present invention.

An optical disc apparatus 1 according to the embodiment of the present invention includes, as illustrated in FIG. 1, an optical pickup 3 for recording and/or reproducing information with respect to an optical disc 2, i.e., an optical recording medium, and a spindle motor 4 which serves as a driver for rotating the optical disc 2. Further, the optical disc apparatus 1 includes, as a driver for the optical pickup 3, a feed motor 5 for moving the optical pickup 3 in the radial direction of the optical disc 2.

The optical disc 2 used in the optical disc apparatus 1 is, for example, a CD (Compact Disc), a CD-R (Recordable), or a CD-RW (ReWritable), which is adapted for use with a semiconductor laser having an emission light wavelength of about 785 nm. Also, the optical disc 2 is, for example, a DVD (Digital Versatile Disc), a DVD-R (Recordable), a DVD-RW (ReWritable), or DVD+RW (ReWritable), which is adapted for use with a semiconductor laser having an emission light wavelength of about 655 nm. Further, the optical disc 2 is a high-density recording optical disc, such as a BD (Blu-ray Disc (registered trademark)), which is adapted for use with a semiconductor laser having an emission light wavelength of about 405 nm (bluish violet).

In the optical disc apparatus 1, the spindle motor 4 and the feed motor 5 are driven and controlled depending on the disc type by a servo control unit 9, which is controlled in accordance with an instruction from a system controller 7 cooperating with a disc type distinguishing unit. The optical disc 2 is driven at the predetermined number of revolutions.

The optical pickup 3 irradiates a light beam to a recording surface of the optical disc 2 and detects a light beam generated upon reflection of the irradiated light beam at the recording surface. Further, the optical pickup 3 supplies, to a preamplifier 14, a signal corresponding to the light beam reflected at the recording surface of the optical disc 2.

The preamplifier 14 generates, based on an output of an optical detector, a focus error signal by using, e.g., the astigmatism method, and also generates a tracking error signal by using, e.g., the 3-beam method, the DPD method, or the DPP method. Further, the preamplifier 14 generates an RF signal and outputs the RF signal to a signal modulator/demodulator & ECC block 15. In addition, the preamplifier 14 outputs the focus error signal and the tracking error signal to the servo control unit 9.

When data is recorded on the optical disc 2 such as a BD, the signal modulator/demodulator & ECC block 15 executes the following processes on a digital signal input from an interface 16 or a D/A & A/D converter 18. More specifically, the signal modulator/demodulator & ECC block 15 executes an error correction process in accordance with one of error correction techniques, e.g., LCD-ECC and BIS, and then executes a modulation process by using the 1-7PP technique. Also, when data is recorded on an optical disc such as a DVD, the signal modulator/demodulator & ECC block 15 executes an error correction process in accordance with an error correction technique using, e.g., PC (Product Code), and then executes a modulation process such as an 8-16 modulation process. Further, when data is recorded on an optical disc such as a CD, the signal modulator/demodulator & ECC block 15 executes an error correction process in accordance with an error correction technique using, e.g., CIRC, and then executes a modulation process such as an 8-14 modulation process. The signal modulator/demodulator & ECC block 15 outputs the modulated data to a laser control unit 21. When data is reproduced from each optical disc, the signal modulator/demodulator & ECC block 15 executes a demodulation process based on the RF signal input from the preamplifier 14. Further, the signal modulator/demodulator & ECC block 15 executes an error correction process and outputs resulting data to the interface 16 or the D/A & A/D converter 18.

When data is recorded after compressing the data, a compression/decompression unit may be disposed between the signal modulator/demodulator & ECC block 15 and the interface 16 or the D/A & A/D converter 18. In that case, the data is compressed in accordance with an ordinary technique, e.g., MPEG2 or MPEG4.

The focus error signal and the tracking error signal are input to the servo control unit 9 from the preamplifier 14. The servo control unit 9 generates a focus servo signal and a tracking servo signal such that the focus error signal and the tracking error signal become 0. In accordance with those servo signals, the servo control unit 9 drives and controls an objective lens driver, e.g., a two-axis actuator for driving an objective lens. Further, the servo control unit 9 detects a sync signal, etc. from the output of the preamplifier 14 and controls the spindle motor by using a CLV (Constant Linear Velocity) or CAV (Constant Angular Velocity) technique, or a combination of both the techniques.

The laser control unit 21 controls a laser light source of the optical pickup 3. In this embodiment, particularly, the laser control unit 21 executes control for setting the output power of the laser light source to different levels between a recording mode and a reproducing mode. Also, the laser control unit 21 may execute control for setting the output power of the laser light source to different levels depending on types of the optical disc 2. In that case, the laser control unit 21 changes over plural laser light sources of the optical pickup 3 one to another depending on the type of the optical disc 2, which is detected by a disc type distinguishing unit 22.

The disc type distinguishing unit 22 can distinguish different formats of the optical discs 2 by detecting change in quantity of reflected light based on, e.g., the differences in surface reflectance, shape, and outer contour among the optical discs.

Blocks constituting the optical disc apparatus 1 are each able to execute signal processing based on the specifications of the optical disc 2, which is loaded at that time, corresponding to the detection result of the disc type distinguishing unit 22.

The system controller 7 controls the entire apparatus corresponding to the type of the optical disc 2, which has been distinguished by the disc type distinguishing unit 22. Also, in response to an operation input from a user, the system controller 7 executes control based on address information and TOC (Table Of Contents), which are recorded in, e.g., a premastered pit or a groove formed at the innermost periphery of the optical disc. On that occasion, the system controller 7 specifies a recording position or a reproducing position on the optical disc where the recording or the reproducing is to be performed, and then controls various components in accordance with the specified position.

In the optical disc apparatus 1 thus constructed, the optical disc 2 is rotated by the spindle motor 4, and the feed motor 5 is driven and controlled in accordance with a control signal from the servo control unit 9. Further, in the optical disc apparatus 1, the optical pickup 3 is moved to a position corresponding to the desired recording track on the optical disc 2 where information is recorded on or reproduced from the optical disc 2.

More specifically, when the optical disc apparatus 1 records or reproduces information, the servo control unit 9 rotates the optical disc 2 by using the CAV or CLV technique, or a combination of both the techniques. The optical pickup 3 irradiates a light beam from the light source and detects a return light beam from the optical disc 2 by an optical detector, thus generating the focus error signal and the tracking error signal. In accordance with the focus error signal and the tracking error signal, the optical pickup 3 drives the objective lens through an objective lens driving mechanism to execute focus servo control and tracking servo control.

When the optical disc apparatus 1 records information, a signal from an external computer 17 is input to the signal modulator/demodulator & ECC block 15 through the interface 16. The signal modulator/demodulator & ECC block 15 adds the predetermined error correction code (described above) to digital data input from the interface 16 or the A/D converter 18, and then executes the predetermined modulation process, thus generating a record signal. The laser control unit 21 controls the laser light source in the optical pickup 3 in accordance with the record signal generated by the signal modulator/demodulator & ECC block 15 such that the information is recorded on the predetermined optical disc.

When the optical disc apparatus 1 reproduces the information recorded on the optical disc 2, the signal modulator/demodulator & ECC block 15 executes a demodulation process on a signal that is detected by the optical detector. When the record signal demodulated by the signal modulator/demodulator & ECC block 15 is to be stored in a computer's data storage, the record signal is output to the external computer 17 through the interface 16. As a result, the external computer 17 can operate in accordance with the signal recorded on the optical disc 2. When the record signal demodulated by the signal modulator/demodulator & ECC block 15 is to be used for the audio/visual purposes, the record signal is subjected to digital-analog conversion in the D/A converter 18 and a resulting analog signal is supplied to an audio/visual processing unit 19. The analog signal is subjected to an audio/visual process in the audio/visual processing unit 19 and is then output to an external speaker or monitor (both not shown) through an audio/visual signal input/output unit 20.

The optical pickup 3 used in the above-described optical disc apparatus 1 will be described in more detail below with reference to FIG. 2.

Figure 2:
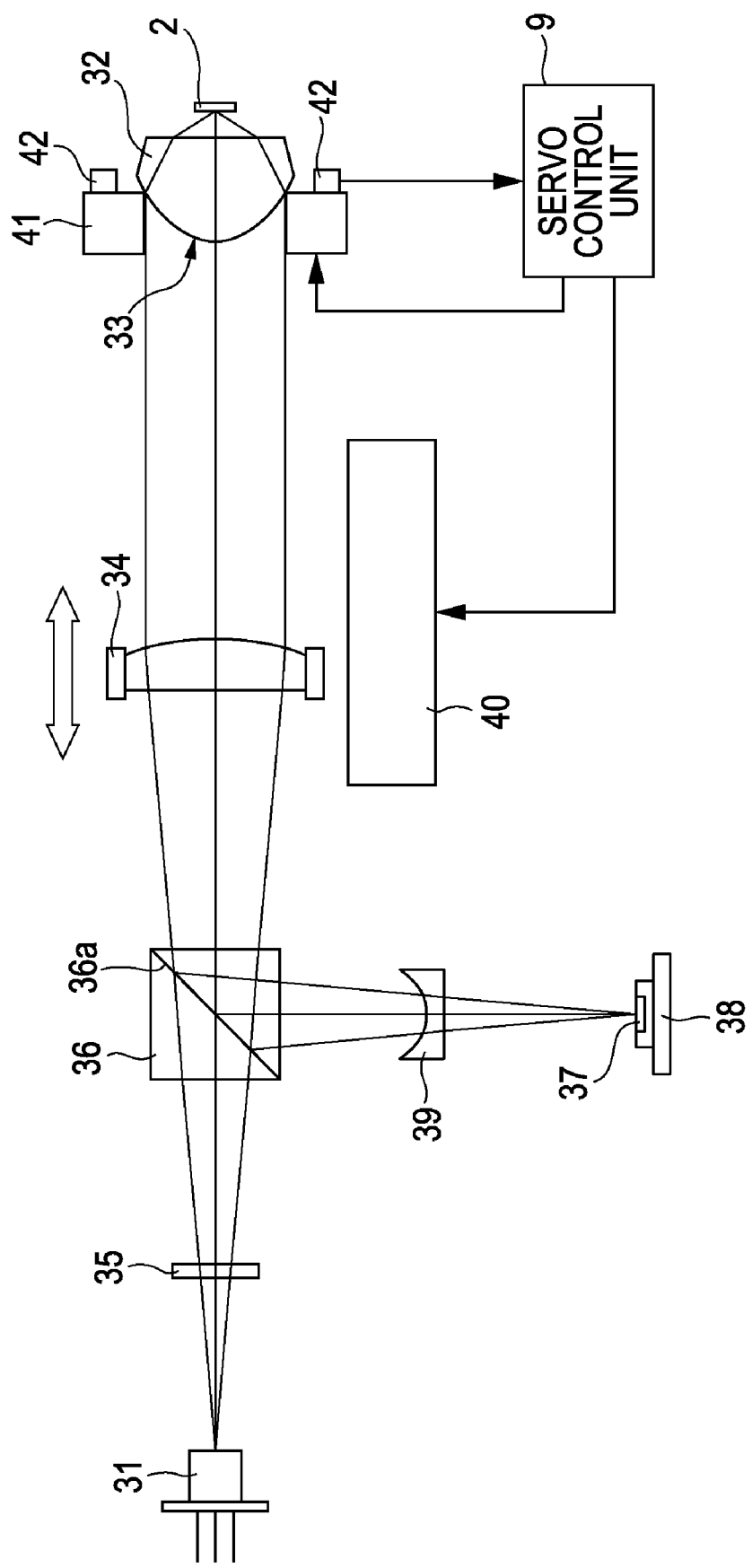
FIG. 2 is an optical path diagram illustrating an optical system of an optical pickup according to the embodiment of the present invention.

The optical pickup 3 used in the embodiment of the present invention includes, as illustrated in FIG. 2, a light source 31, e.g., a semiconductor laser device emitting a laser beam at a predetermined wavelength, and an objective lens 32 for condensing the laser (light) beam emitted from the light source 31 onto the optical disc 2. Further, the optical pickup 3 includes, between the light source 31 and the objective lens 32, a collimator lens 34 which serves as a divergent angle conversion lens for converting a divergent angle of the incident light beam.

Still further, the optical pickup 3 includes, between the light source 31 and the collimator lens 34, a (diffraction) grating 35 for detecting a tracking error. The optical pickup 3 includes, between the grating 35 and the collimator lens 34, a beam splitter 36 which serves an optical path separator for separating a return light beam reflected at the optical disc 2 from an optical path of the light beam, which has been emitted from the light source 31 to propagate through a way going to the optical disc 2.

In addition, the optical pickup 3 includes an optical detector 38 serving as an optical detection device and having a light receiving portion 37 that receives and detects the return light beam separated from the going light beam by the beam splitter 36. The optical pickup 3 includes, between the beam splitter 36 and the light receiving portion 37, a multi-lens 39 for condensing the light beam, which enters the multi-lens 39 from the beam splitter 36, onto a light receiving surface of the light receiving portion 37 and for applying astigmatism to the light beam for detection of the focus error signal, etc.

The light source 31 emits the light beam at a wavelength of, e.g., about 405 nm. Note that the wavelength of the light beam emitted from the light source 31 is not limited to the above-mentioned value, and the light source may emit a light beam at a wavelength of, e.g., about 655 nm or about 785 nm. Alternatively, those plural light beams having different wavelengths may be selectively emitted to corresponding optical discs. Further, the optical pickup 3 may include plural light sources capable of emitting respective light beams at different wavelengths.

The grating 35 is disposed between the light source 31 and the collimator lens 34 and diffracts the light beam emitted from the light source 31 into three beams for detection of the tracking error signal, etc., the three beams being output toward the collimator lens 34.

The beam splitter 36 has a separation surface 36a for causing the going light beam, which is introduced from the grating 35 to enter the beam splitter 36, to pass through it for outputting toward the collimator lens 34, and for causing the return light beam, which is introduced from the collimator lens 34 to enter the beam splitter 36, to be reflected thereat for outputting toward the multi-lens 39. The separation surface 36a is formed to have polarization dependency, for example, which provides the above-described function. With the presence of the separation surface 36a, the beam splitter 36 functions as an optical path separator for separating the going light beam, which enters the beam splitter 36 through the grating 35, and the return light beam, which is reflected at the optical disc 2 and enters the beam splitter 36 through the objective lens 32 and the collimator lens 34.

The collimator lens 34 is disposed in the optical path between the beam splitter 36 and the objective lens 32, and it is movable in the direction of an optical axis for converting the divergent angle of the light beam to a predetermined divergent angle depending on a position in the direction of the optical axis to which the collimator lens 34 has moved. For example, the collimator lens 34 causes the incident light beam to be output toward the objective lens 32 in a state of a substantially parallel beam or in a state convergent or divergent relative to the substantially parallel beam. Further, the optical pickup 3 includes a collimator lens driving mechanism 40 which serves as a driver for driving the collimator lens 34 to move in the direction of the optical axis. The collimator lens driving mechanism 40 is controlled by the servo control unit 9 such that the position of the collimator lens 34 can be adjusted depending on change in environmental temperature. The collimator lens driving mechanism 40 drives the collimator lens 34 in a stepped manner as described later.

The objective lens 32 condenses the light beam incoming from the collimator lens 34 to be condensed onto a signal recording surface of the optical disc 2. The objective lens 32 is made of a refractive element having, on one surface thereof, a diffraction structure in a stepped shape or a blazed sectional shape, which generates diffraction light providing a spot adapted to perform satisfactory recording and reproducing.

More specifically, as illustrated in FIG. 3, the objective lens 32 has a diffraction structure 33 of a concentrically zoned shape formed in its surface on the incident side. The diffraction structure 33 of the objective lens 32 functions as a diffraction portion for applying, to the light beam passing through the objective lens 32, diffractive power in addition to refractive power that is applied by a curved surface of the objective lens 32. Further, as described later, the diffraction structure 33 has the function of applying diffractive power depending on temperature change and canceling aberration that is generated in optical parts, including the objective lens 32, due to the temperature change.

The objective lens 32 having the diffraction structure 33 is formed such that $\Delta WFA/(\Delta T \times f)$ falls within a predetermined range. Herein, $\Delta WFA$ denotes an amount of wavefront aberration of the objective lens 32 corresponding to change in environmental temperature, $\Delta T$ denotes an amount of the change in environmental temperature, and f denotes a focal length of the objective lens 32. Further, $\Delta WFA/(\Delta T \times f)$ has a different range for each diffraction order when diffraction lights of first to fifth orders are used. In more detail, when the first-order light is used, $\Delta WFA/(\Delta T \times f)$ satisfies a relationship of $2.5 \times 10^{-3} \leq \Delta WFA/(\Delta T \times f) \leq 2.6 \times 10^{-3}$. When the second-order light is used, $\Delta WFA/(\Delta T \times f)$ satisfies a relationship of $1.8 \times 10^{-3} \leq \Delta WFA/(\Delta T \times f) \leq 2.6 \times 10^{-3}$. When the third-order light is used, $\Delta WFA/(\Delta T \times f)$ satisfies a relationship of $1.1 \times 10^{-3} \leq \Delta WFA/(\Delta T \times f) \leq 2.6 \times 10^{-3}$. When the fourth-order light is used, $\Delta WFA/(\Delta T \times f)$ satisfies a relationship of $0.7 \times 10^{-3} \leq \Delta WFA/(\Delta T \times f) \leq 2.6 \times 10^{-3}$. When the fifth-order light is used, $\Delta WFA/(\Delta T \times f)$ satisfies a relationship of $0.2 \times 10^{-3} \leq \Delta WFA/(\Delta T \times f) \leq 2.6 \times 10^{-3}$. The focal length f of the objective lens 32 satisfies a relationship of $1.4 \text{ mm} \leq f \leq 2.6 \text{ mm}$. The reason is that, if the focal length f is smaller than the lower limit value, the necessity of correction by driving the collimator lens is reduced because spherical aberration generated due to temperature change is small. Also, if the focal length f is larger than the upper limit value, the spherical aberration generated due to temperature change is so increased that a pitch in correction obtained by driving the collimator lens is too small.

With the provision of the diffraction structure 33, the objective lens 32 can correct part of wavefront aberration, which is generated due to the change in environmental temperature, by the diffractive power changing action of the objective lens 32. Accordingly, the objective lens 32 having the diffraction structure 33 can reduce an amount of movement of the collimator lens to be driven in comparison with that in the related art in which the wavefront aberration generated due to temperature change is reduced just by driving the collimator lens, etc. In other words, the objective lens 32 having the diffraction structure 33 can reduce the size and the weight of the entire apparatus by reducing the amount of movement of the collimator lens to be driven. Further, the objective lens 32 having the diffraction structure 33 can simplify a system for driving the collimator lens for the reason that the objective lens 32 can correct part of the wavefront aberration, which is generated due to change in environmental temperature, by the diffractive power changing action of the diffraction structure 33 and can reduce an amount to be corrected by moving the collimator lens, etc.

Moreover, the objective lens 32 is formed such that the spherical aberration generated due to temperature change satisfies a relation formula of $|\Delta SA5_T - (\Delta SA3_T/\Delta SA3_m) \times \Delta SA5_m| \leq 0.020 \, \lambda\text{rms}$ and a relation formula of $|\Delta SA7_T - (\Delta SA3_T/\Delta SA3_m) \times \Delta SA7_m| \leq 0.020 \, \lambda\text{rms}$. Herein, $\Delta SA3_T$ denotes third-order spherical aberration generated due to temperature change, $\Delta SA5_T$ denotes fifth-order spherical aberration generated due to temperature change, and $\Delta SA7_T$ denotes seventh-order spherical aberration generated due to temperature change. Also, $\Delta SA3_m$ denotes third-order spherical aberration generated due to change in objective incident magnification, $\Delta SA5_m$ denotes fifth-order spherical aberration generated due to change in objective incident magnification, and $\Delta SA7_m$ denotes seventh-order spherical aberration generated due to change in objective incident magnification. Herein, the term "change in objective incident magnification" implies change in magnification of the light beam incident upon the objective lens 32, which is caused by temperature change.

Since the above-described objective lens 32 can reduce an amount of residual components left after canceling higher-order aberrations, i.e., fifth- and seventh-order spherical aberrations, the wavefront aberration generated due to change in environmental temperature can be further reduced in cooperation with the movement of the collimator lens 34.

The optical pickup 3 includes a two-axis actuator 41 as the objective lens driving mechanism for driving the objective lens 32 in a focusing direction, i.e., the direction of the optical axis of the objective lens 32, and in a tracking direction, i.e., the radial direction of the optical disc 2 perpendicular to the focusing direction. The two-axis actuator 41 is controlled by the servo control unit 9. The objective lens 32 is held by the two-axis actuator 41 in a movable manner. The objective lens 32 is moved by the two-axis actuator 41 in accordance with the tracking error signal and the focus error signal, which are generated based on the light beam returned from the optical disc 2 and detected by the optical detector 38. Thus, the objective lens 32 is moved in two-axis directions, i.e., the direction toward or away from the optical disc 2 and the radial direction of the optical disc 2. As a result, the objective lens 32 converges the light beam from the light source 31 to be reliably focused to the signal recording surface of the optical disc 2, and also causes the converted light beam to follow a record track formed on the signal recording surface of the optical disc 2. In addition, the objective lens 32 as a component of the optical pickup 3 is made of plastic, e.g., synthetic resin, and is formed as a single lens for the purpose of reducing the weight and the production cost.

The multi-lens 39 is disposed between the beam splitter 36 and the light receiving portion 37 and applies a predetermined level of refractive power to the return light beam which has been reflected at the signal recording surface of the optical disc 2 and then reflected by the beam splitter 36 after passing through the objective lens 32 and the collimator lens 34. The multi-lens 39 focuses the return light beam to the light receiving surface of the light receiving portion 37 (e.g., a photodetector) of the optical detector 38. At that time, the multi-lens 39 applies, to the return light beam, astigmatism for the purpose of detecting the focus error signal, etc.

The optical detector 38 has the light receiving portion 37 formed of a light receiving device, e.g., a photodetector. The optical detector 38 receives the light beam focused by the multi-lens 39 at the light receiving portion 37 and detects not only an information signal, but also various detection signals, such as the focus error signal and the tracking error signal.

In addition to the above-described objective lens 32 having the diffraction structure 33, the optical pickup 3 includes an implement for reducing the wavefront aberration generated due to change in environmental temperature. Stated another way, the optical pickup 3 includes an environmental change detecting unit for detecting change in environment of optical parts, which constitute the optical pickup 3, in the vicinity of the optical pickup 3. More specifically, in the embodiment, a temperature sensor 42 is disposed as an environmental change detecting unit at a position near the objective lens 32 which is made of plastic and which generates large wavefront aberration due to temperature change. The temperature sensor 42 is attached to, e.g., the two-axis actuator 41 to detect change in environmental temperature near the objective lens 32. The temperature sensor 42 for detecting change in environmental temperature near the objective lens 32 detects the change in environment of the optical parts constituting the optical pickup 3 and supplies the detection result to the servo control unit 9. Thus, the temperature sensor 42 controls the collimator lens driving mechanism 40 through the servo control unit 9. As a result, the collimator lens 34 is moved to a position corresponding to the detected temperature change through the servo control unit 9 and the collimator lens driving mechanism 40. In such a manner, the collimator lens 34 is driven step by step so as to correct the residual components left after correcting the wavefront aberration, which is generated due to change in environmental temperature, by the diffractive power changing action of the objective lens 32 depending on the temperature change.

The optical pickup 3 constructed as described above drives the objective lens 32 to displace in accordance with the focus error signal and the tracking error signal, which are obtained from the optical detector 38. Thus, in the optical pickup 3, the objective lens 32 is moved to the in-focus position with respect to the signal recording surface of the optical disc 2 such that the light beam is focused to the signal recording surface of the optical disc 2. In that state, information is recorded on or reproduced from the optical disc 2.

The optical pickup 3 and the optical disc apparatus 1 are intended to overcome the problems caused in the optical system including the objective lens made of plastic when information is recorded on and/or reproduced from a high-density optical disc. In other words, the optical pickup 3 and the optical disc apparatus 1 can correct change in the spherical aberration, which is generated due to change in environmental temperature, in a way not adversely affecting the system while maintaining desired optical characteristics.

An operation flow of a correction system in the optical disc apparatus 1 will be described below. When information is recorded and/or reproduced in the optical disc apparatus 1, the collimator lens 34 is driven to actively correct the spherical aberration, which is generated in the optical system due to change in environmental temperature, after executing the focus servo control and the tracking servo control. Among spherical aberrations generated in the optical system, attention is herein paid particularly to the spherical aberration generated in the objective lens 32 made of plastic. Instead of directly detecting and correcting the aberration, the temperature around the objective lens 32 is monitored by the temperature sensor 42 to correct the spherical aberration generated corresponding to temperature change. Further, in the system used in the embodiment, the spherical aberration is corrected by moving the collimator lens 34 step by step through a predetermined amount for each predetermined temperature range instead of driving the collimator lens in real time in a feedback manner depending on the detection result of the temperature sensor. System simplification can be realized with the stepwise driving.

Figure 4:
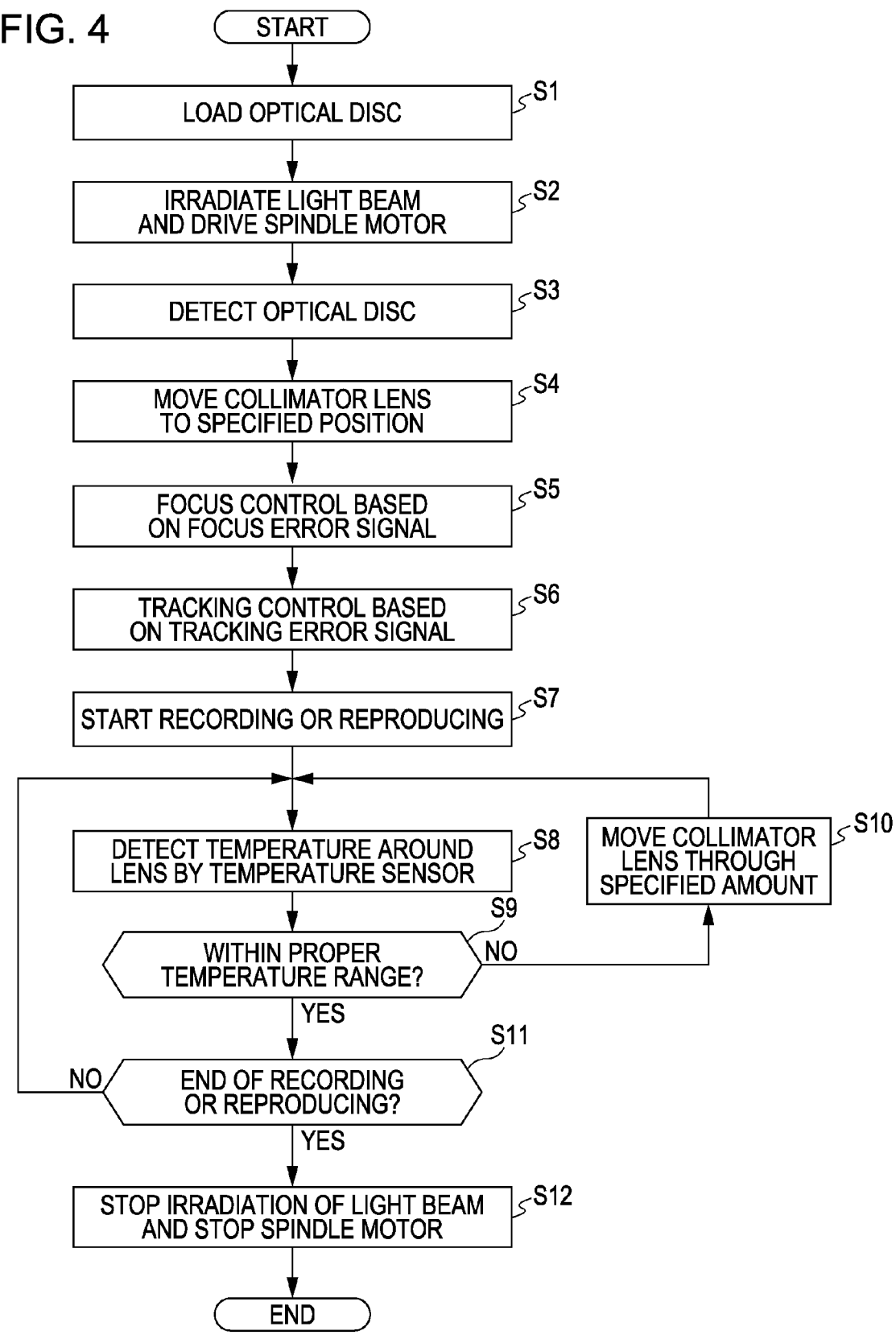
FIG. 4 is a flowchart of a recording and reproducing method to explain a temperature detection system for use with the recording and reproducing method that is practiced by using the optical disc apparatus according to the embodiment of the present invention.

Concretely, the optical disc apparatus 1 including the optical pickup 3 executes a recording and reproducing method in accordance with a flowchart illustrated in FIG. 4.

In step S1, the optical disc 2 is loaded into a disc loading portion of the optical disc apparatus 1. In step S2, the laser control unit 21 controls the light source 31 to emit the light beam, and the servo control unit 9 drives the spindle motor 4 to rotate the optical disc 2 loaded in the disc loading portion. In step S3, the optical pickup 3 and the disc type distinguishing unit 22 cooperate to detect the optical disc 2.

In step S4, the servo control unit 9 controls the collimator lens driving mechanism 40 under control of the system controller 7 such that the collimator lens 34 is moved to a predetermined position. At that time, the collimator lens 34 is moved to a reference position corresponding to the type of the optical disc 2, which has been detected by the disc type distinguishing unit 22. The reference position is a position of the collimator lens 34 where the aberration is reduced in a proper temperature range (described later).

In step S5, the servo control unit 9 drives the two-axis actuator 41 in accordance with the focus error signal to move the objective lens 32 in the focusing direction, thus executing focus control. In step S6, the servo control unit 9 drives the two-axis actuator 41 in accordance with the tracking error signal to move the objective lens 32 in the tracking direction, thus executing tracking control.

In step S7, the optical pickup 3 starts recording or reproducing of an information signal with respect to the optical disc 2. In step S8, the temperature sensor 42 detects the environmental temperature around the objective lens 32.

In step S9, the servo control unit 9 determines whether the environmental temperature detected by the temperature sensor 42 is within the proper temperature range. If it is determined in step S9 that the environmental temperature detected by the temperature sensor 42 is not within the proper temperature range, the processing advances to step S10. On the other hand, if it is determined in step S9 that the environmental temperature detected by the temperature sensor 42 is within the proper temperature range, the processing advances to step S11.

In step S10, the servo control unit 9 moves the collimator lens 34 through a distance that is previously set corresponding to the environmental temperature detected by the temperature sensor 42. Thereafter, the processing returns to step S8. More specifically, in accordance with a signal supplied from the temperature sensor 42, the servo control unit 9 controls the collimator lens driving mechanism 40 under control of the system controller 7, thus moving the collimator lens 34 to the predetermined position. At that time, the collimator lens 34 is driven step by step corresponding to the temperature detected by the temperature sensor 42.

In step S11, the system controller 7 determines whether the recording or reproducing operation is brought to an end. If the system controller 7 determines in step S1 that the recording or reproducing operation is brought to an end, the processing advances to step S12. On the other hand, if the system controller 7 determines in step S11 that the recording or reproducing operation is not brought to an end, the processing returns to step S8.

In step S12, the laser control unit 21 stops the emission of the light beam from the light source 31, and the servo control unit 9 stops the driving of the spindle motor 4.

Characteristics necessary for the objective lens 32, which is used in the above-described optical disc apparatus 1 and optical pickup 3, will be described below.

A description is first made for a lower limit of the wavefront aberration that is to be taken into consideration in design of the objective lens 32.

Figure 3A:
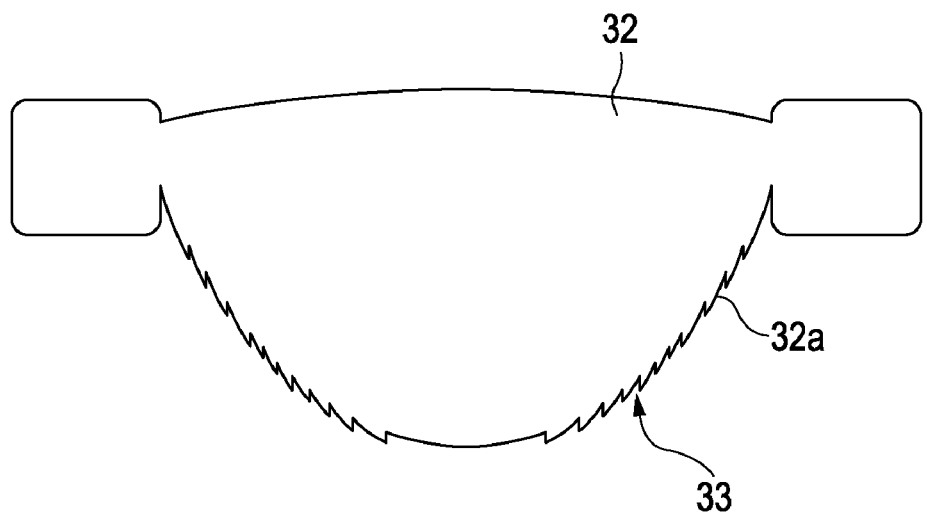
FIGS. 3A and 3B illustrate an objective lens and a diffraction structure thereof, the objective lens being one component of the optical pickup according to the embodiment of the present invention; specifically.
Figure 3B:
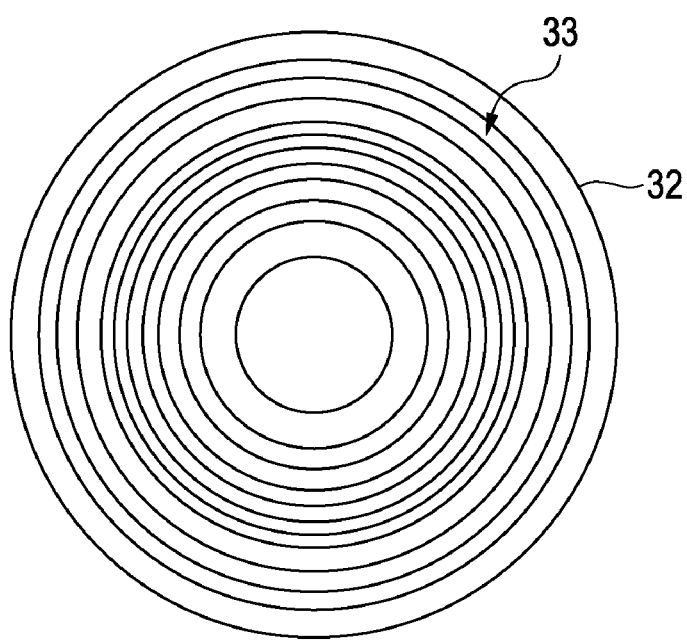

As illustrated in FIGS. 3A and 3B, the objective lens 32 has, on its entire incident surface, the diffraction structure 33 which is formed in a concentrically blazed shape in addition to a basic refractive shape. The objective lens 32 having that diffraction structure 33 forms a satisfactory focus spot on the signal recording surface of the optical disc by not only refracting the incident light beam at the lens surface having the refractive shape, but also diffracting the incident light beam in a direction, which corresponds to a phase Φ expressed by the following formula (1), by the diffraction structure 33. In the following formula (1), k denotes a design diffraction order, $\lambda_0$ denotes a design wavelength of the diffraction structure, Cn denotes a coefficient of the phase difference function, and r denotes a radial position of the objective lens. In addition, Φ denotes a phase amount to be corrected.

$$\Phi = \kappa \sum_{n=1} \frac{C_n r^{2n}}{\lambda_0} K \qquad (1)$$

Figure 5A:
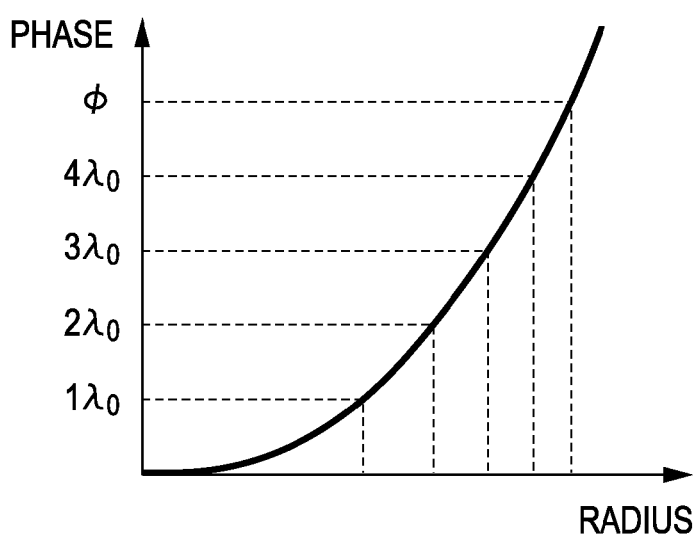
FIGS. 5A, 5B and 5C are graphs to explain a manner of determining a pitch of the diffraction structure; specifically
Figure 5B:
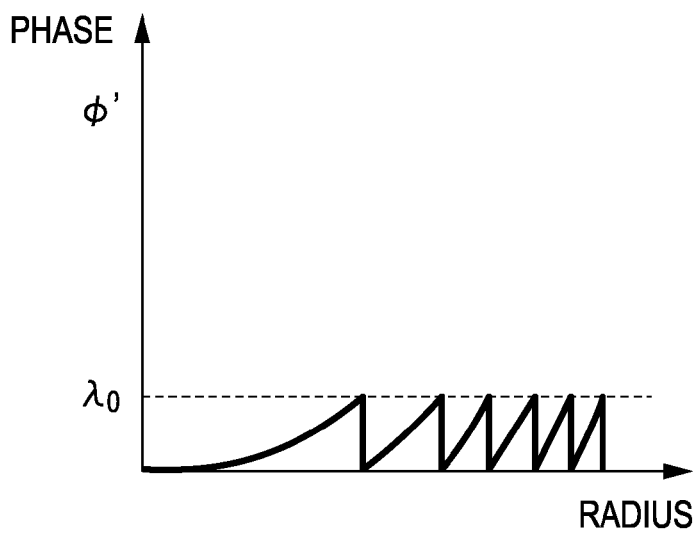
Figure 5C:
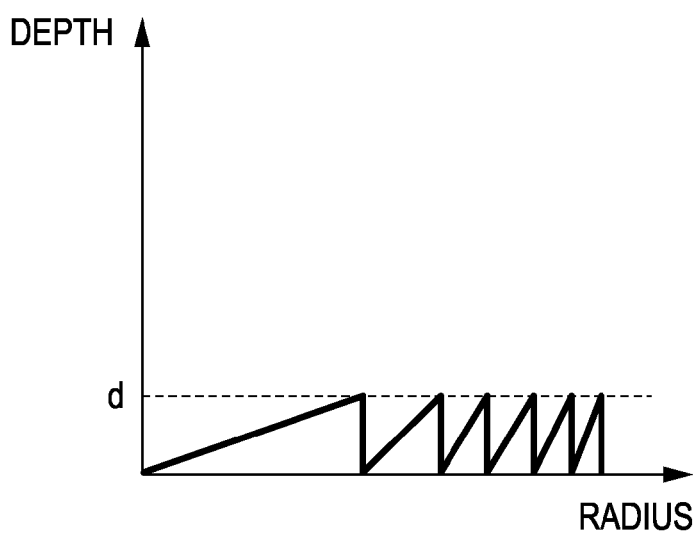

The pitch of the diffraction structure 33 can be calculated based on Φ in the formula (1). The actual pitch of the diffraction structure 33 is determined and provided so as to follow the shape expressed by Φ. Because Φ in the formula (1) represents the phase at the design wavelength $\lambda_0$, the phase expressed by Φ provides the same influence as that provided by Φ' expressed by a relation formula of $\Phi'=\Phi-n\lambda_0$. Stated another way, Φ' expressed by the above relation formula is a value resulting from dividing Φ, illustrated in FIG. 5A, by $\lambda_0$ and obtaining the residue as illustrated in FIG. 5B, i.e., a value obtained by the so-called residue number arithmetic. Therefore, Φ' can be said as being a phase amount that is to be applied in determining the actual pitch of the diffraction structure. The actual pitch of the diffraction structure is determined from Φ'. Concretely, as illustrated in FIG. 5C, the actual pitch of the diffraction structure is determined so as to follow the shape expressed by Φ'. The horizontal axis in each of FIGS. 5A to 5C indicates the radial position of the optical disc. The vertical axis in FIG. 5A indicates the phase amount Φ necessary at each radial position. The vertical axis in FIG. 5B indicates the phase amount Φ' to be applied, which is obtained at each radial position by the residue number arithmetic. The vertical axis in FIG. 5C indicates a groove depth d.

Figure 6:
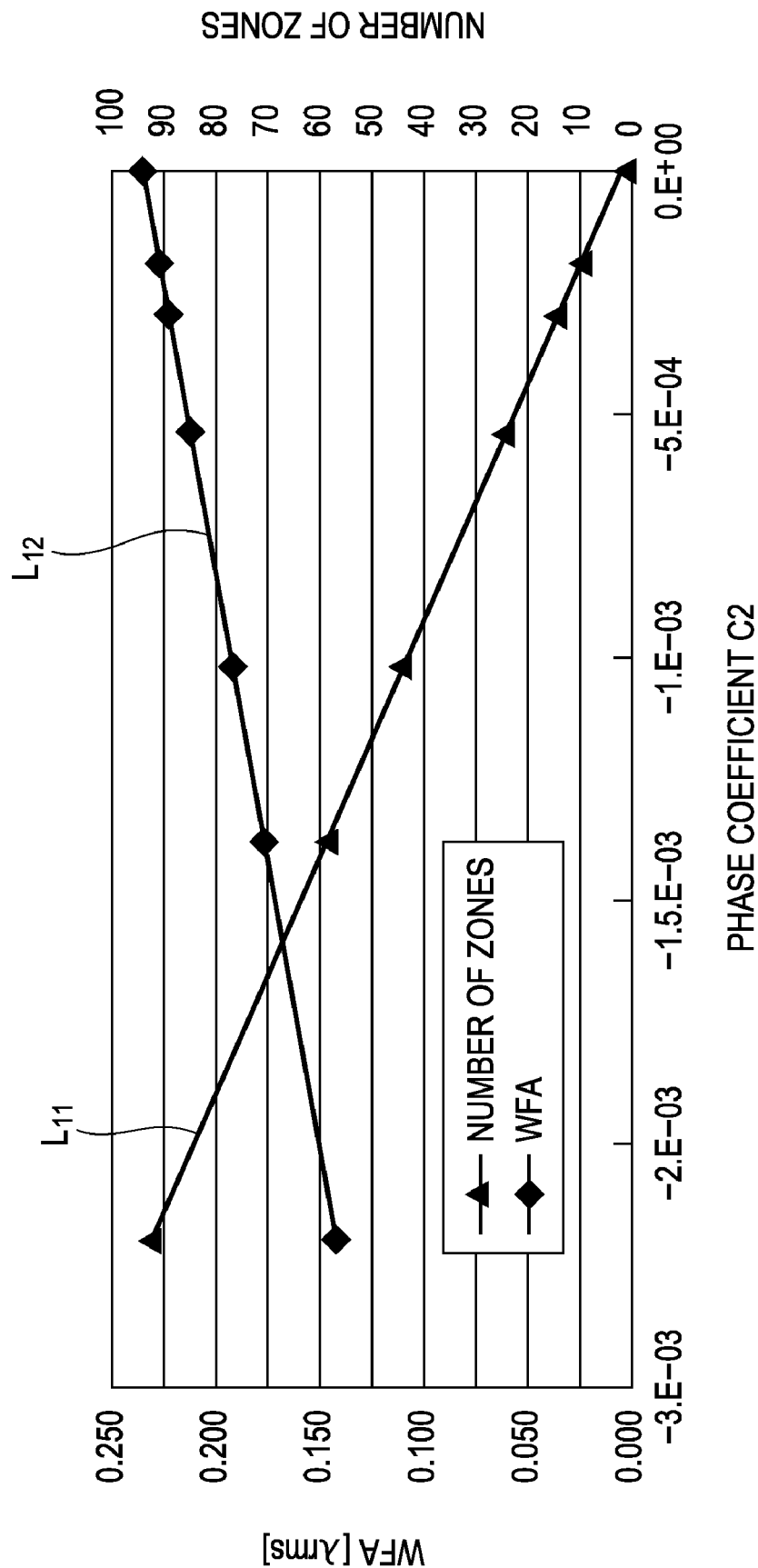
FIG. 6 is a graph showing the relationship between the number of zones in the diffraction structure and the phase coefficient C2 in the objective lens.

The relationship between the number of zones in the diffraction structure and a phase coefficient C2 will be described below. FIG. 6 is a graph showing the relationships of the phase coefficient C2 with respect to the number of zones in the diffraction structure and a wavefront aberration amount WFA. The phase coefficient C2 is a coefficient that is generally used to correct a temperature-aberration characteristic. When the phase coefficient C2 is set to a value equal to or larger than a certain level, the spherical aberration generated due to change in environmental temperature greatly affects the temperature-aberration characteristic. In FIG. 6, the horizontal axis indicates the phase coefficient C2, and the vertical axis indicates the wavefront aberration amount WFA and the number of zones in the diffraction structure. Further, $L_{11}$ in FIG. 6 represents change in the number of zones depending on change in the phase coefficient C2. $L_{12}$ represents change in wavefront aberration amount WFA depending on change in the phase coefficient C2.

As seen from the relationships of FIG. 6, as the phase coefficient C2 increases on the minus side, the number of zones in the diffraction structure 33 increases and a degree of deterioration in the wavefront aberration generated due to change in environmental temperature reduces.

Figure 7:
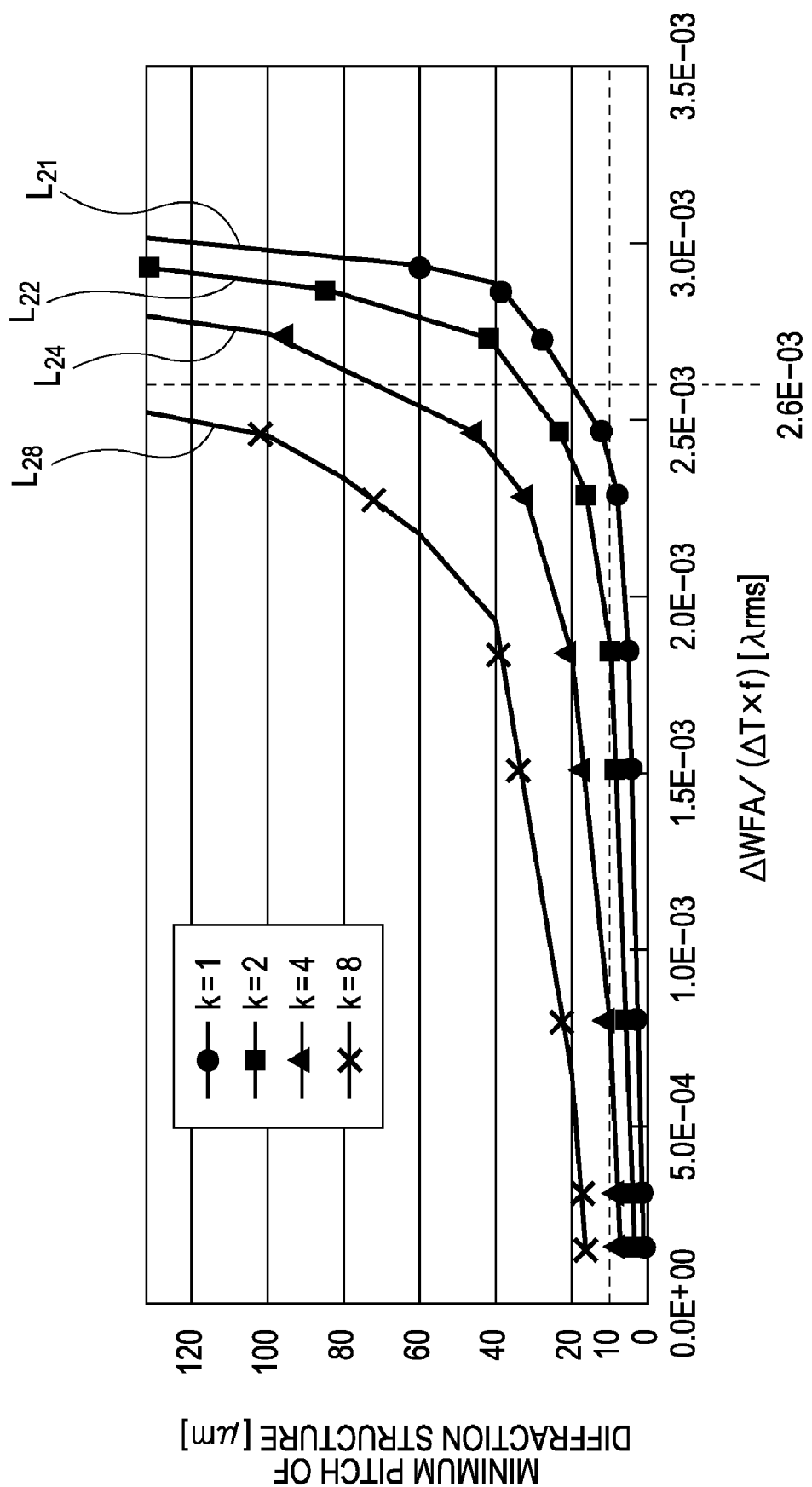
FIG. 7 is a graph showing the relationship between wavefront aberration generated due to change in environmental temperature and a minimum pitch of the diffraction structure.

Also, the larger number of zones implies a smaller pitch of the diffraction structure 33 per zone formed on the diffraction surface. FIG. 7 shows the relationship between residual wavefront aberration generated due to change in environmental temperature and a minimum pitch of the diffraction structure.

In FIG. 7, the horizontal axis indicates the wavefront aberration generated due to change in environmental temperature by using a parameter expressed by $\Delta WFA/(\Delta T \times f)$ ($\lambda$rms), and the vertical axis indicates the minimum pitch (μm) of the diffraction structure. Herein, $\Delta WFA$ denotes an amount of change in the above-mentioned WFA, $\Delta T$ denotes an amount of temperature change, and f denotes the focal length. In FIG. 7, $L_{21}$ represents the relationship between the wavefront aberration of first-order light, i.e., in the case of k=1, and the minimum pitch. $L_{22}$ represents the relationship between the wavefront aberration of second-order light, i.e., in the case of k=2, and the minimum pitch. $L_{24}$ represents the relationship between the wavefront aberration of fourth-order light, i.e., in the case of k=4, and the minimum pitch. $L_{28}$ represents the relationship between the wavefront aberration of eighth-order light, i.e., in the case of k=8, and the minimum pitch.

From the viewpoint of minimizing the wavefront aberration generated due to change in environmental temperature, as described above, it is desirable to narrow the pitch of the diffraction structure 33 and to apply more phases thereto. However, narrowing the pitch of the diffraction structure 33 implies an increase in difficulty in forming the diffraction structure 33. Such an increase in difficulty in manufacturing a desired diffraction structure leads to a reduction in diffraction efficiency, which is caused by the fact that the actual structure is not desired one. Further, an area subjected to machining loss is increased, thus reducing light utilization efficiency that is an important lens characteristic. Accordingly, when the diffraction structure is actually formed, there is a lower limit in the pitch, which has to be specified.

When molding a plastic lens, a mold having an original shape of the lens is machined. A tip of a machining bite used at that time usually has a flat portion of about 1 to 2 μm in order to increase surface accuracy (finish) of the cut surface. Therefore, particularly when the mold is machined so as to provide the blazed diffraction structure 33 on a curved surface, a not-machined region is generated due to restriction imposed by the shape of the machining bite, as illustrated in FIG. 8, thus causing a deviation in shape from the desired diffraction structure.

Figure 8:
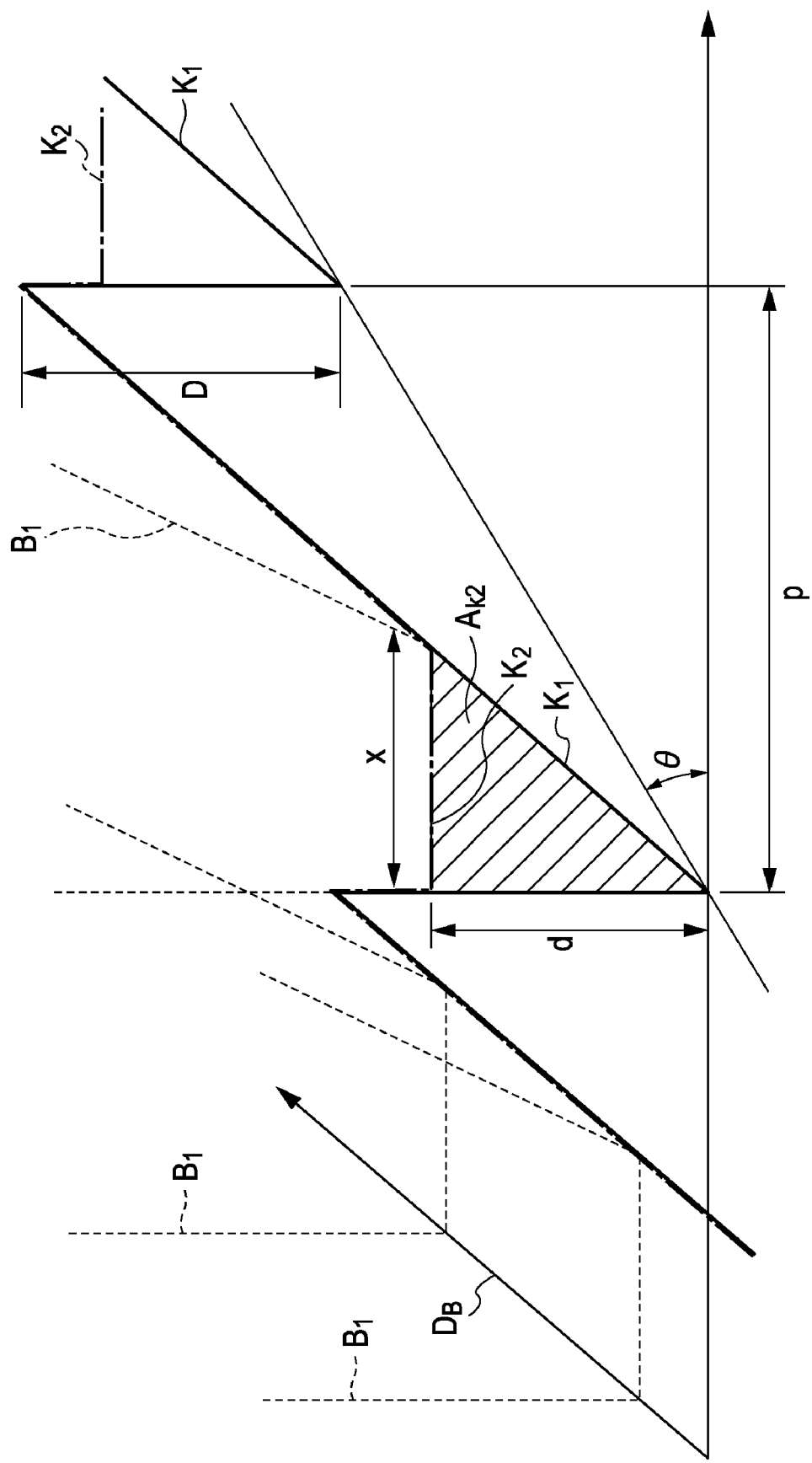
FIG. 8 is a sectional view of a mold and a mold machining bite, the view serving to explain generation of an uncut portion that is not machined due to the structural relationship between the mold for forming the object lens and the mold machining bite to machine the mold.

In FIG. 8, $B_I$ indicated by a dotted line represents a metallic machining bite, an arrow DB represents the machining direction of the metallic machining bite, and x represents a bite flat length, i.e., a length of the tip flat portion of the bite. Also, a solid line $K_1$ in FIG. 8 represents an ideal shape of the mold for forming the diffraction structure, and D represents an ideal depth. A one-dot-chain line $K_2$ represents a shape actually machined and formed by the metallic machining bite, and a hatched area $AK_2$ represents an uncut amount, i.e., a portion left after cutting due to the above-mentioned shape of the bite tip. Further, d represents a depth of the uncut portion. Note that the generation of the uncut portion due to the shape of the bite tip is also called a "machining loss". Further, in FIG. 8, P denotes the pitch of the diffraction structure, and θ denotes an incident angle of light upon the lens surface.

Figure 9:
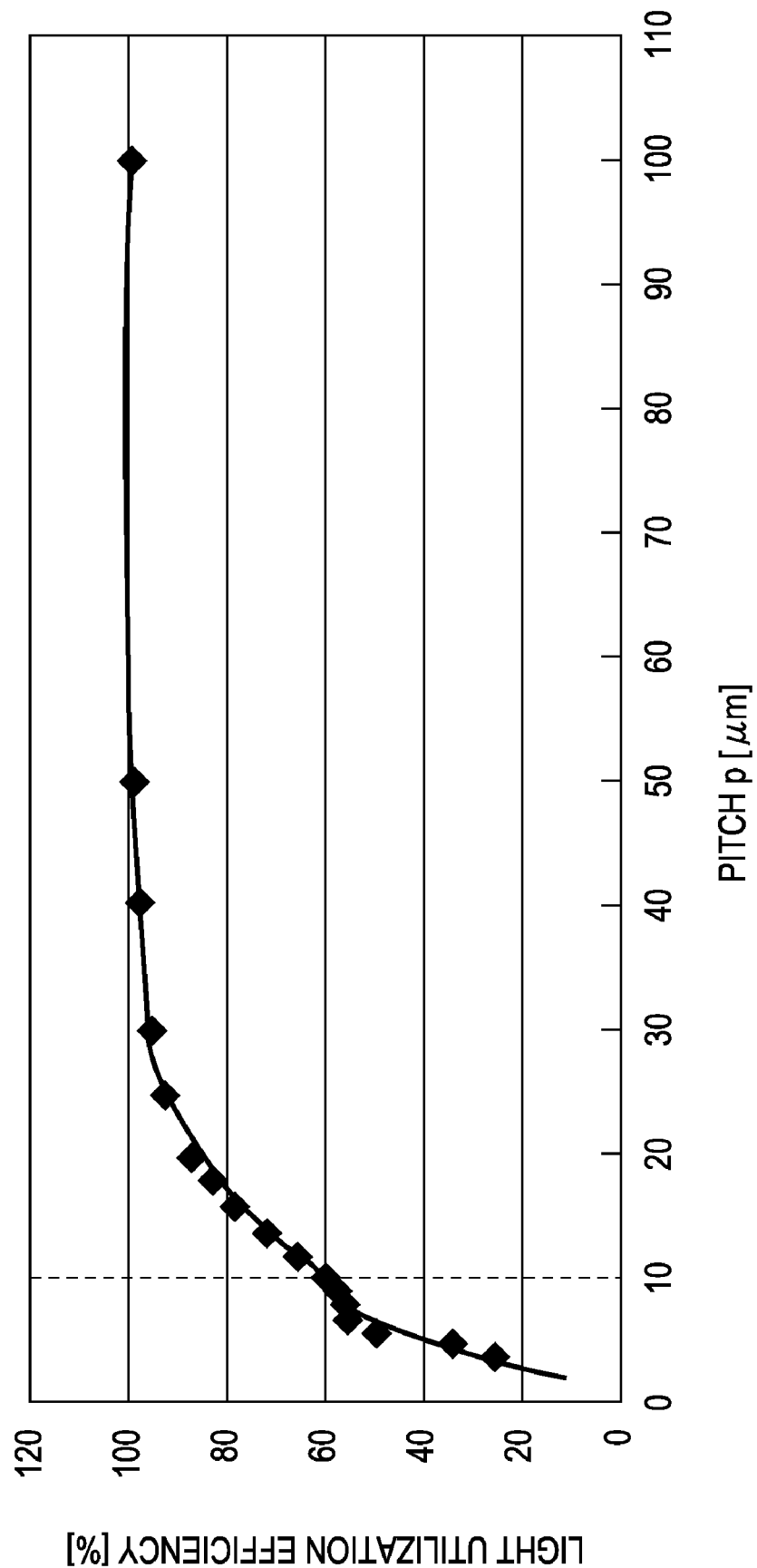
FIG. 9 is a graph showing the relationship between the pitch of the diffraction structure and light utilization efficiency, the graph serving to explain the relationship between the diffraction pitch and a reduction of the light utilization efficiency caused by machining loss.

Assuming x=1 μm, ideal depth=3100 nm, and diffraction light of fourth order, for example, FIG. 9 shows the relationship between diffraction efficiency and pitch when the actual shape of the diffraction structure differs from the ideal blazed structure. In other words, FIG. 9 is a graph serving to explain the relationship between the pitch of the diffraction structure and a reduction of the light utilization efficiency caused by the machining loss. A curve in FIG. 9 represents change in the light utilization efficiency corresponding to change in the pitch. The horizontal axis in FIG. 9 indicates the pitch P (μm), and the vertical axis indicates the light utilization efficiency (%).

As seen from FIG. 9, the narrower the pitch to be formed, the lower is the light utilization efficiency. While the diffraction structure is determined based on the phase function expressed by the above-mentioned formula (1), the light utilization efficiency usually reduces in an outer peripheral portion of the diffraction lens for the reason that the pitch of the diffraction structure is continuously narrowed as a radial position on the lens approaches the outer peripheral portion. Assuming that the pitch is relatively large and the cutting loss (machining loss) does not occur in a central portion of the lens, a difference in the efficiency is generated between the central portion and the outer peripheral portion, thus reducing the performance of a focus spot formed by the lens on the optical disc. For that reason, a limit value in reduction of the efficiency in the outer peripheral portion is 60%, and the minimum value of the diffraction pitch is 10 μm from the relationship of FIG. 9.

Looking at the relationship between $\Delta WFA/(\Delta T \times f)$ and the minimum pitch of the diffraction structure shown in FIG. 7 again, a value of $\Delta WFA/(\Delta T \times f)$ at which the diffraction pitch becomes 10 μm differs depending on the diffraction order (i.e., k=1, 2, 4 and 8). When the diffraction structure is designed by using the higher diffraction order, stronger diffractive power can be applied even at the same pitch, and larger spherical aberration can be compensated for. In other words, the diffraction pitch can be set to be relatively large. However, when the diffraction structure is designed by using the higher diffraction order, the groove depth of the diffraction structure has to be increased, thus increasing a difficulty in forming the diffraction structure. Such an increased difficulty reduces the efficiency and increases a variation in the efficiency with temperature change, whereby optical characteristics deteriorate. Accordingly, an upper limit of the diffraction order is about fifth order.

A lower limit value of $\Delta WFA/(\Delta T \times f)$ can be determined from FIG. 7, at which the diffraction pitch becomes 10 μm when each of the diffraction orders is used. Concretely, the lower limit value of $\Delta WFA/(\Delta T \times f)$ in the case of k=1 is $2.5 \times 10^{-3}$. The lower limit value thereof in the case of k=2 is $1.8 \times 10^{-3}$, and the lower limit value thereof in the case of k=3 is $1.1 \times 10^{-3}$. Further, the lower limit value thereof in the case of k=4 is $0.7 \times 10^{-3}$, and the lower limit value thereof in the case of k=5 is $0.2 \times 10^{-3}$.

An upper limit of the wavefront aberration, which is to be taken into consideration in forming the objective lens 32, will be described below.

Let here assume a lens which has a small effect of correcting a temperature characteristic with diffraction. The wavefront aberration generated due to change in environmental temperature primarily includes aberration components which are symmetrical about the optical axis, such as third-, fifth- and seventh-order spherical aberrations. Those axis-symmetrical aberration components generated due to change in environmental temperature can be canceled by generating third-, fifth- and seventh-order spherical aberrations of magnification in opposite polarity with, e.g., a unit for moving the collimator lens 34 in the direction of the optical axis. From the viewpoint of optical performance, it is desirable to monitor the wavefront aberration generated due to change in environmental temperature at all times, and to feedback control the driving of the collimator lens such that the wavefront aberration is completely canceled. In practice, however, such feedback control imposes a large load on the system. For that reason, the embodiment performs stepwise correction for each unit temperature range, as illustrated in FIG. 10, as a method for reducing the system load while maintaining the optical performance.

Figure 10:
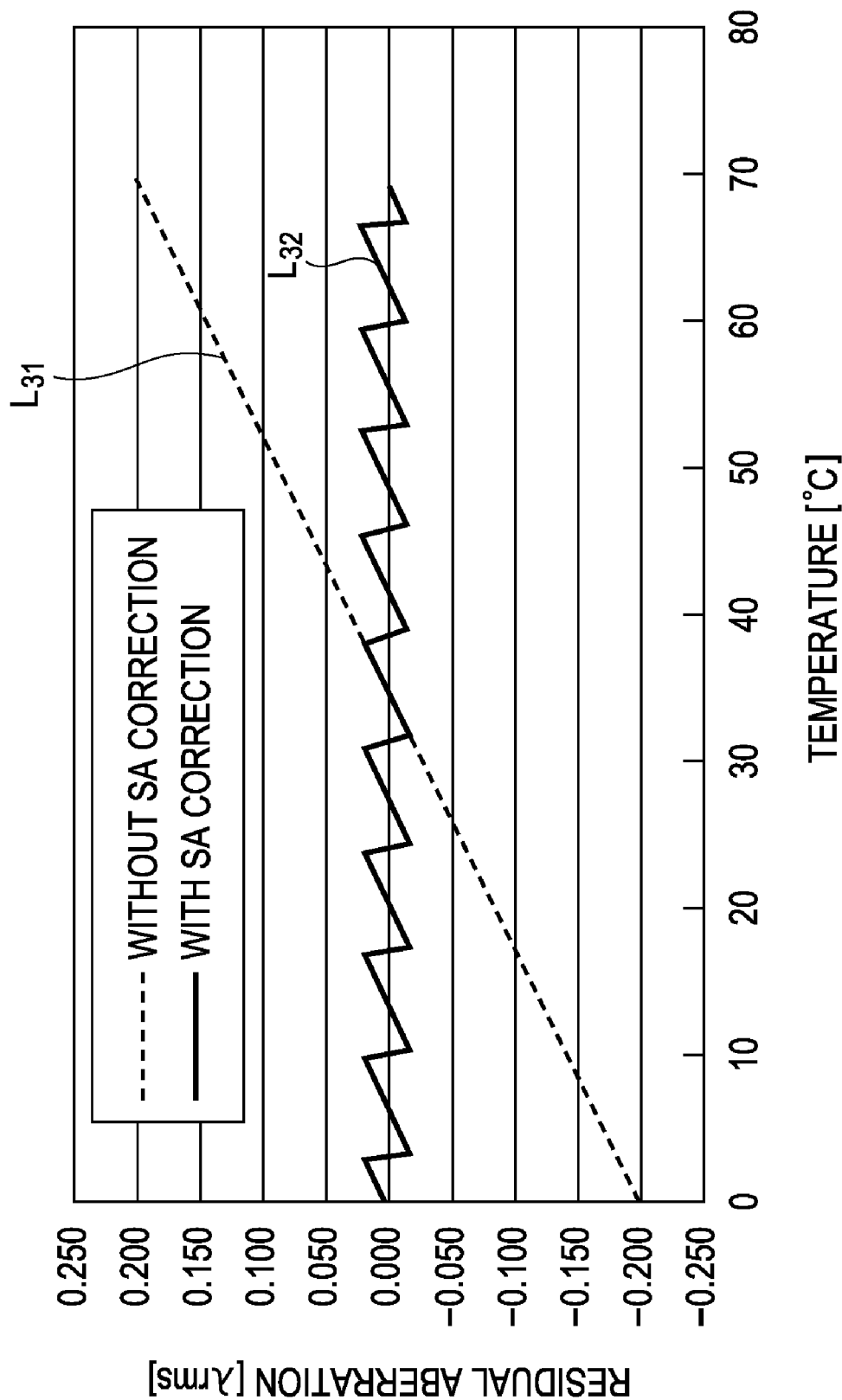
FIG. 10 is a graph showing the relationship between temperature change and residual aberration, the graph serving to explain the wavefront aberration generated due to change in environmental temperature depending on the presence or absence of correction.

FIG. 10 is a graph to explain the wavefront aberration generated due to change in environmental temperature depending on the presence or absence of correction. More specifically, FIG. 10 shows the relationship between change in environmental temperature and residual aberration depending on whether active correction of SA (spherical aberration) is performed or not. In the graph of FIG. 10, the horizontal axis indicates temperature (° C.), and the vertical axis indicates residual aberration ($\lambda$rms). $L_{31}$ represents change in the residual aberration due to temperature change in the case of not correcting the SA (spherical aberration), and $L_{32}$ represents change in the residual aberration due to temperature change in the case of correcting the SA (spherical aberration).

Generally, when perturbations, such as disc rotations, environmental changes, and disturbances, are applied in a state where the third-order spherical aberration component of about 0.020 $\lambda$rms remains, the servo-controlled state of the optical pickup is adversely affected. Therefore, a correction step is performed such that the residual third-order spherical aberration is held within ±0.020 $\lambda$rms. The following description is made, for example, in connection with a lens which has f=2.2 mm and $\Delta$WFA/($\Delta$T×f)=2.6×10$^{-3}$, i.e., which exhibits deterioration of the wavefront aberration due to change in environmental temperature to a relatively large extent.

Further, assuming that 35° C. is set as a design temperature center and the correction is performed over the range of 0° C. to 70° C., i.e., over change of ±35° C., a correction temperature pitch is 7° C. and the number of times of correction is 12. In comparison with the correction based on the feedback control, the number of times of correction is reduced and the system control is facilitated.

When the wavefront aberration is generated due to temperature change at higher sensitivity, the correction temperature pitch is narrowed and the number of times of correction is increased correspondingly. In such a case, control capable of holding the residual aberration to be 0.020 $\lambda$rms or less is not ensured because of a limitation in the performance of a temperature monitor and a temperature variation near the actuator, and the optical performance is seriously affected. Accordingly, even when the mechanism for canceling the generated wavefront aberration by the spherical aberration of magnification generated with the lens driving is employed, the upper limit of wavefront-aberration variation sensitivity $\Delta$WFA/($\Delta$T×f) of the objective lens itself depending on change in environmental temperature is also desirably 2.6× 10$^{-3}$.

Figure 11A:
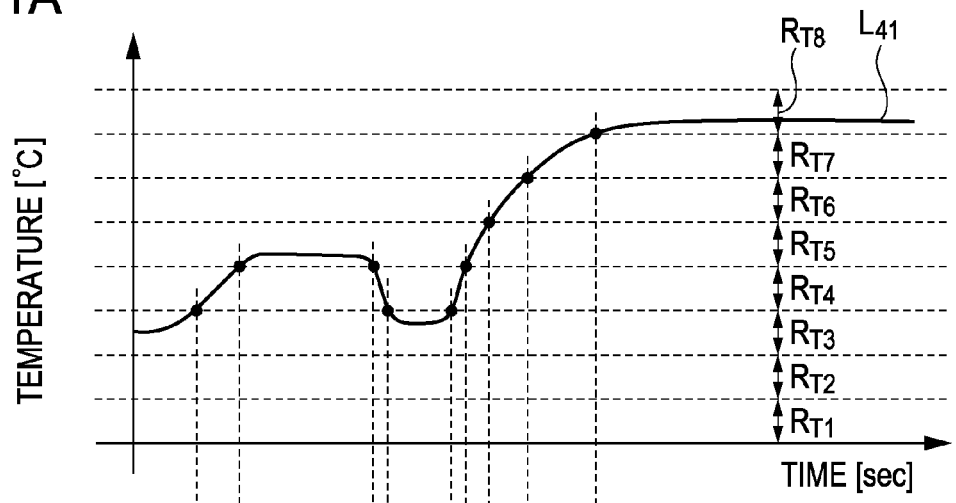
FIGS. 11A, 11B and 11C are charts showing the relationships among temperature change, corresponding positions of a collimator lens, and corresponding change in residual spherical aberration after movement of the collimator lens.
Figure 11B:
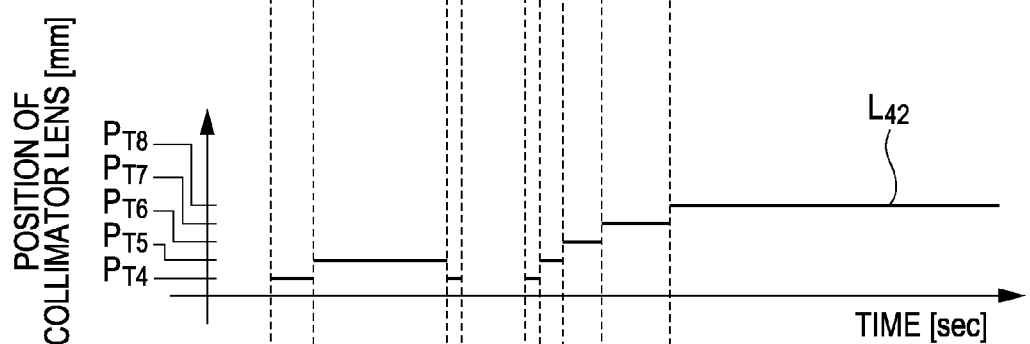
Figure 11C:

A system constructed by using the objective lens 32 having the diffraction structure 33, which is defined to so as satisfy the above-described range, can reduce the number of times for correcting the spherical aberration generated due to change in environmental temperature and can perform the correction with high accuracy while maintaining the light utilization efficiency. FIGS. 11A, 11B and 11C show a process for correcting the spherical aberration by driving the collimator lens 34 in a stepwise manner.

More specifically, FIGS. 11A, 11B and 11C are charts showing the relationships among temperature change, corresponding positions of the collimator lens 34 driven, and corresponding change in residual spherical aberration after the driving of the collimator lens 34. In FIG. 11A, $L_{41}$ represents temperature change with the lapse of time. The horizontal axis indicates time (sec), and the vertical axis indicates temperature (° C.). $R_{T1}$ to $R_{T8}$ represent first to eighth temperature ranges, respectively. The first to eighth temperature ranges are each a range corresponding to an amount of movement of the collimator lens 34 when the collimator lens 34 is driven in the stepwise manner as described above. Herein, the third temperature range $R_{T3}$ is a range including the design temperature, i.e., the temperature at which the collimator lens 34 is located at a reference position. In FIG. 11B, $L_{42}$ represents change in position of the collimator lens 34 with the lapse of time. The horizontal axis indicates time (sec), and the vertical axis indicates the collimator lens position (mm). $P_{T4}$ to $P_{T8}$ represent the collimator lens positions adapted for the fourth to eighth temperature ranges $R_{T4}$ to $R_{T0}$, respectively. In FIG. 11C, $L_{43}$ represents change in the residual spherical aberration with the lapse of time. The horizontal axis indicates time (sec), and the vertical axis indicates an amount of the residual spherical aberration ($\lambda$rms). As seen from FIGS. 11A, 11B and 11C, the embodiment can reduce not only the spherical aberration generated due to change in environmental temperature, but also the number of times of driving the collimator lens and the amount of movement of the collimator lens.

The influence of higher-order spherical aberrations, which is to be taken into consideration in forming the objective lens 32, will be described below.

Figure 12:
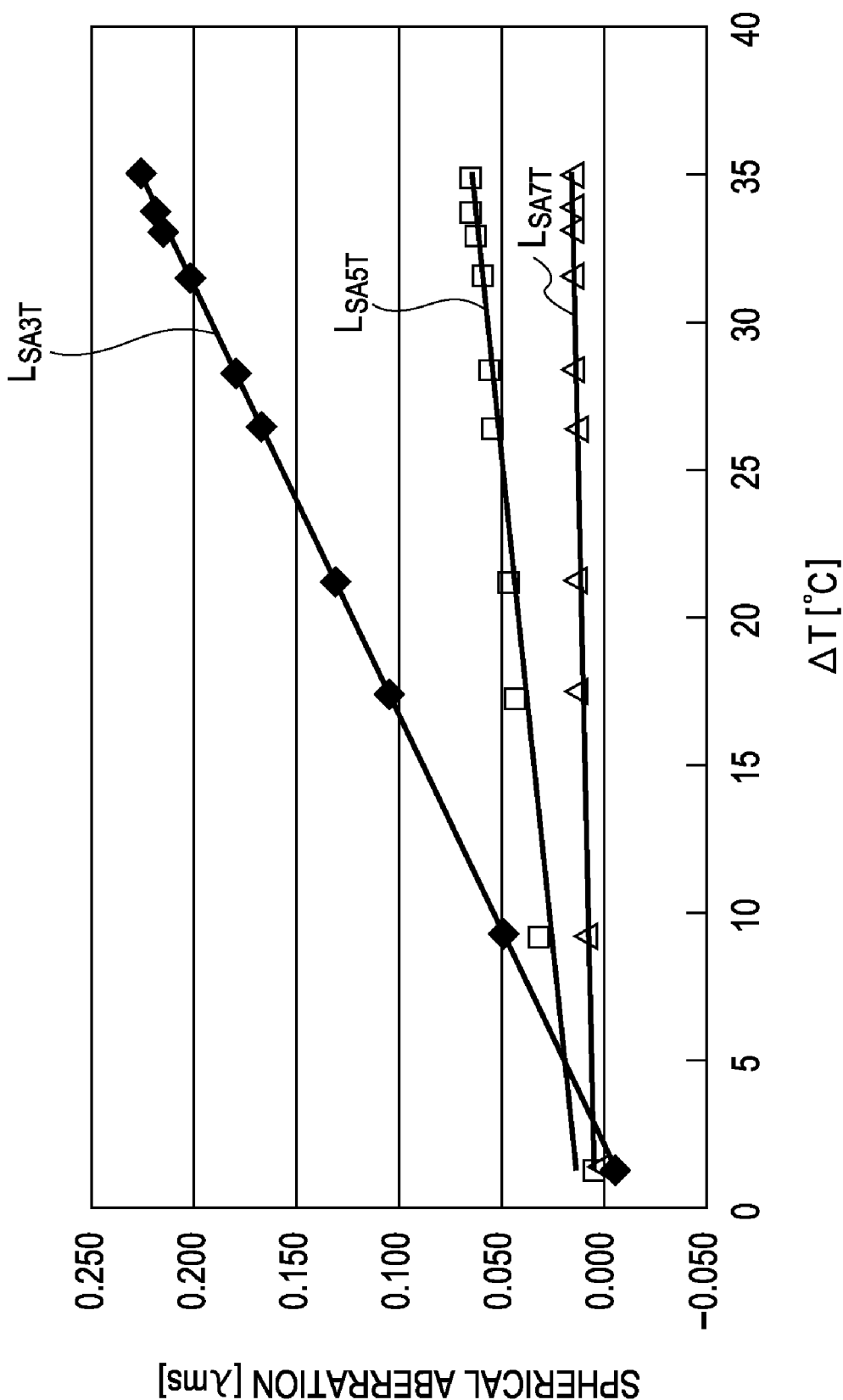
FIG. 12 is a graph showing details of spherical aberration components generated when environmental temperature is changed.
Figure 13:
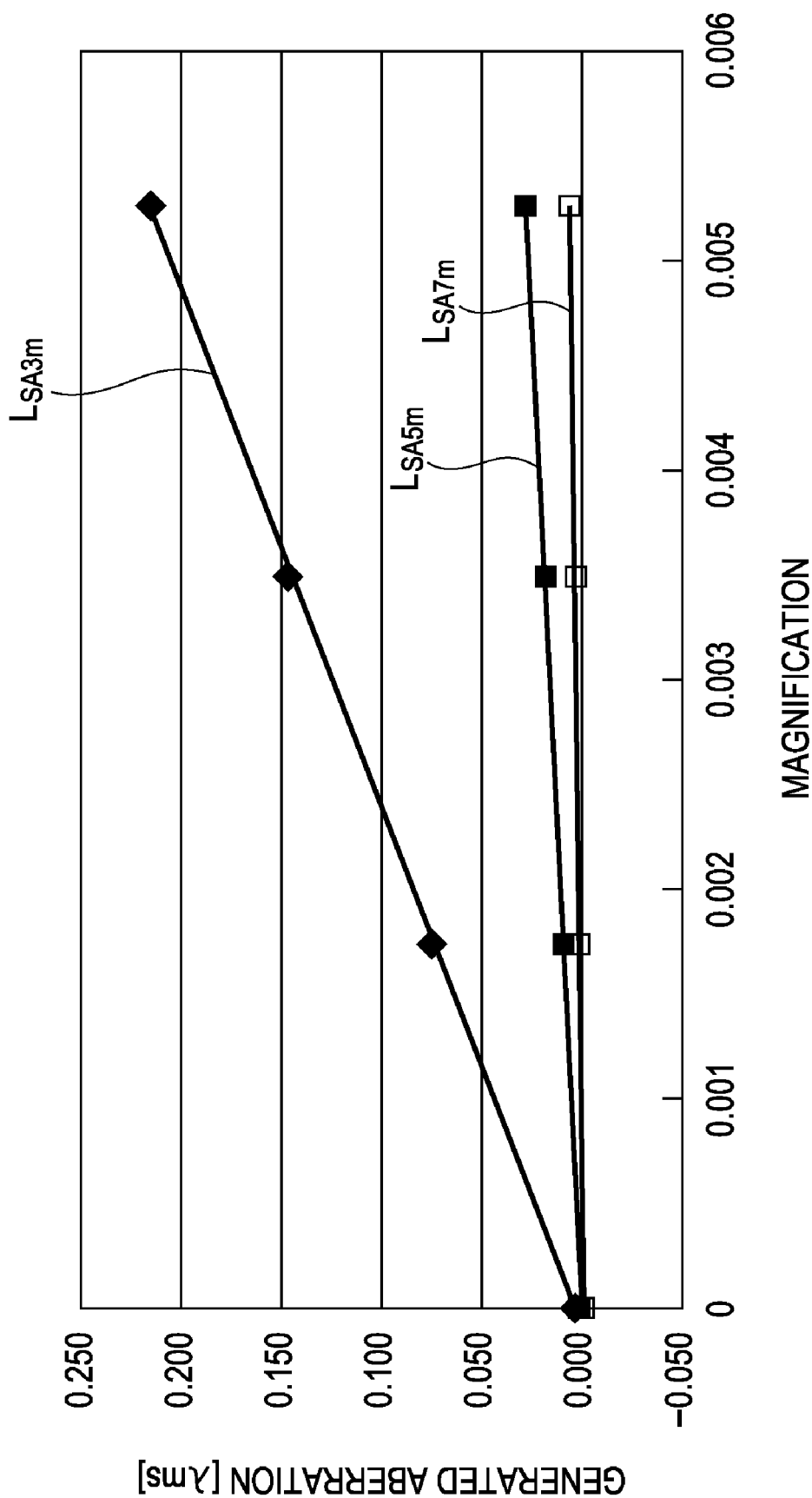
FIG. 13 is a graph showing details of spherical aberration components when a magnification is changed.

As in the above description, the following description is made, for example, in connection with the lens which has f=2.2 mm and $\Delta$WFA/($\Delta$T×f)<2.6×10$^{-3}$, i.e., satisfying the upper limit thereof. FIG. 12 shows details of spherical (wavefront) aberration components generated when environmental temperature is changed and FIG. 13 is a graph showing details of spherical (wavefront) aberration components when an incident magnification of the objective lens is changed. In FIG. 12, $L_{SA3T}$ denotes third-order spherical aberration $\Delta SA3_T$ generated due to temperature change, $L_{SA5T}$ denotes fifth-order spherical aberration $\Delta SA5_T$ generated due to temperature change, and $L_{SA7T}$ denotes seventh-order spherical aberration $\Delta SA7_T$ generated due to temperature change. In FIG. 12, the horizontal axis indicates temperature change $\Delta T$ (° C.), and the vertical axis indicates the spherical aberration ($\lambda$rms). In FIG. 13, $L_{SA3m}$ denotes third-order spherical aberration $\Delta SA3_m$ generated due to change in objective incident magnification, $L_{SA5m}$ denotes fifth-order spherical aberration $\Delta SA5_m$ generated due to change in objective incident magnification, and $L_{SA7m}$ denotes seventh-order spherical aberration $\Delta SA7_m$ generated due to change in objective incident magnification. In FIG. 13, the horizontal axis indicates the magnification, and the vertical axis indicates the generated aberration ($\lambda$rms).

As seen from FIGS. 12 and 13, the third-, fifth- and seventh-order spherical aberrations are generated at different ratios when respective perturbations are applied, i.e., between when the temperature is changed and when the magnification is changed. Concretely, the third-, fifth- and seventh-order spherical aberrations satisfy the relationships expressed by the following formulae (2) and (3):

$$\Delta SA3_T : \Delta SA5_T : \Delta SA7_T = 1 : 0.24 : 0.06 \quad (2)$$

$$\Delta SA3_m : \Delta SA5_m : \Delta SA7_m = 1 : 0.13 : 0.03 \quad (3)$$

From those relationships, it is understood that the wavefront aberration generated due to temperature change are not completely corrected even by the correction method of driving the collimator lens along the optical axis. To completely correct the third-order spherical aberration generated due to temperature change by the spherical aberration of magnification, the following formulae (4) and (5) have to be satisfied:

$$\Delta SA3_T - a \times \Delta SA3_m = 0 \quad (4)$$

$$a = \Delta SA3_T / \Delta SA3_m \quad (5)$$

An amount of the fifth-order spherical aberration corrected in that case is expressed by the following formula (6):

$$Z_5(T,m) = \Delta SA5_T - \Delta SA5_m \times a \quad (6)$$

Thus, regarding an uncorrected residual amount of the fifth-order spherical aberration as one of uncorrected residual amounts of the higher-order spherical aberrations generated due to change in temperature characteristic, the following formula (7) has to be satisfied to maintain the optical performance even against the perturbations applied:

$$|Z_5(T,m)| = |\Delta SA5_T - (\Delta SA3_T/\Delta SA3_m) \times \Delta SA5_m| \leq 0.020 \; \lambda\text{rms} \quad (7)$$

Similarly, regarding an uncorrected residual amount of the seventh-order spherical aberration as another one of the uncorrected residual amounts of the higher-order spherical aberrations, the following formula (8) has to be satisfied:

$$|Z_7(T,m)| = |\Delta SA7_T - (\Delta SA3_T/\Delta SA3_m) \times \Delta SA7| \leq 0.020 \; \lambda\text{rms} \quad (8)$$

As described above, the optical pickup 3 and the optical disc apparatus 1 are featured in including the system that maintains recording and reproducing characteristics by correcting the wavefront aberration, which is generated due to change in environmental temperature, at a certain proportion by the diffractive power changing action of the objective lens 32, and by correcting the residual component of the wavefront aberration with the stepwise driving of the collimator lens 34 per temperature change range. The objective lens 32 constituting the optical pickup 3 is formed in consideration of the lower and upper limits of the wavefront aberration and the influences of the higher-order spherical aberrations, and can reduce the aberration, which is generated due to temperature change, in cooperation with the stepwise driving of the collimator lens 34. More specifically, the objective lens 32 is able to cancel or compensate for part of the wavefront aberration, which is generated due to change in environmental temperature, by the diffractive power changing action developed with the diffraction structure 33 of the objective lens 32. On the other hand, the collimator lens driving mechanism 40 and the temperature sensor 42 reduce the residual component of the wavefront aberration, which is left after cancellation of the wavefront aberration by the objective lens 32, to such a range where the recording and reproducing characteristics are not affected, by driving the collimator lens 34 to the position corresponding to the environmental temperature. Further, since the objective lens 32 cancels part of the aberration, which is generated due to temperature change, by the diffractive power changing action thereof as described above, the driving of the collimator lens 34 can be performed in a stepwise manner instead of a linear manner. Accordingly, an excessive load can be prevented from imposing on the control unit of the optical disc apparatus 1, etc.

Thus, with the optical pickup 3 and the optical disc apparatus 1 according to the embodiment of the present invention, even when the environmental temperature is changed, generation of the spherical aberration can be suppressed and the optical characteristics can be maintained by cooperation of the predetermined diffraction structure 33 formed on one surface of the objective lens 32 with the driving of the collimator lens 34 depending on the detection result of the temperature sensor 42. In the optical pickup 3, therefore, the objective lens 32 can be made of plastic, for example, and the driving stroke of the collimator lens 34 can be reduced. As a result, the recording and reproducing characteristics can be maintained, a reduction in size and weight of the apparatus can be realized, and the apparatus construction can be simplified. Further, the optical pickup 3 and the optical disc apparatus 1 according to the embodiment of the present invention can realize satisfactory recording and reproducing characteristics by reducing the aberration generated due to change in environmental temperature. In addition, the optical pickup 3 and the optical disc apparatus 1 according to the embodiment of the present invention is particularly effective in an optical system including an objective lens made of plastic when information is recorded on and/or reproduced from a high-density optical disc, such as a BD, in which strict aberration management is necessary.

With the optical pickup 3 and the optical disc apparatus 1 according to the embodiment of the present invention, since the spherical aberration generated due to change in temperature characteristic is corrected by the objective lens 32 to some extent, the stroke amount by which the collimator lens 34 is driven for the additional correction can be reduced and, therefore, the size of the optical system can be reduced. Also, with the optical pickup 3 and the optical disc apparatus 1, the temperature pitch in correction with the active driving of the collimator lens 34 can be held smaller and the control can be facilitated. Further, with the optical pickup 3 and the optical disc apparatus 1, since the spherical aberration generated due to change in temperature characteristic is corrected by the driving of the collimator lens 34 to some extent, the diffraction structure of the objective lens 32 does not have to be so fine and a reduction in efficiency caused by a loss in machining the diffraction structure can be held small. Accordingly, the light utilization efficiency of the objective lens 32 can be increased and the light utilization efficiency of the entire apparatus can also be increased. In addition, with the optical pickup 3 and the optical disc apparatus 1, since the collimator lens 34 is used as a divergent angle conversion lens, which serves to convert magnification, instead of using a plurality of lenses, the construction of the optical system can be simplified and the production cost can be reduced. Thus, with the optical pickup 3 and the optical disc apparatus 1, the spherical aberration generated due to change in temperature characteristic is corrected by using two approaches, and those two approaches can be appropriately combined with each other in such a manner that their demerits are suppressed to be not significant. As a result, the optical pickup 3 and the optical disc apparatus 1 can realize satisfactory recording and reproducing characteristics.

The present application contains subject matter related to that disclosed in Japanese Priority Patent Application JP 2008-176049 filed in the Japan Patent Office on Jul. 4, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
   a light source emitting a light beam;
   an objective lens condensing the light beam emitted from the light source onto an optical disc;
   at least one divergent angle conversion lens disposed between the light source and the objective lens and changing a divergent angle of the light beam;
   driving means for driving the at least one divergent angle conversion lens in a direction of an optical axis;
   an optical detection device detecting a return light beam reflected at the optical disc; and
   an environmental change detecting unit configured to detect change in environmental temperature, wherein the objective lens is made of a refractive element having, on one surface thereof, a diffraction structure in a stepped shape or a blazed sectional shape, which generates diffraction light providing a spot adapted to perform satisfactory recording and/or reproducing, the objective lens satisfying a relationship of $2.5 \times 10^{-3} \leq \Delta WFA/(\Delta T \times f) \leq 2.6 \times 10^{-3}$ when first-order light is used, a relationship of $1.8 \times 10^{-3} \leq \Delta WFA/(\Delta T \times f) \leq 2.6 \times 10^{-3}$ when second-order light is used, a relationship of $1.1 \times 10^{-3} \leq \Delta WFA/(\Delta T \times f) \leq 2.6 \times 10^{-3}$ when third-order light is used, a relationship of $0.7 \times 10^{-3} \leq \Delta WFA/(\Delta T \times f) \leq 2.6 \times 10^{-3}$ when fourth-order light is used, and a relationship of $0.2 \times 10^{-3} \leq \Delta WFA/(\Delta T \times f) \leq 2.6 \times 10^{-3}$ when fifth-order light is used ($\Delta WFA$ denotes an amount of wavefront aberration of the objective lens corresponding to change in environmental temperature, $\Delta T$ denotes an amount of the change in environmental temperature, and f denotes a focal length of the objective lens), and wherein the at least one divergent angle conversion lens is driven step by step in accordance with a detection result of the environmental change detecting unit.

2. The optical pickup according to claim 1, wherein the wavefront aberration generated in the objective lens due to temperature change satisfies a relation formula of $|\Delta SA5_T - (\Delta SA3_T/\Delta SA3_m) \times \Delta SA5_m| \leq 0.020$ λrms and a relation formula of $|\Delta SA7_T - (\Delta SA3_T/\Delta SA3_m) \times \Delta SA7_m| \leq 0.020$ λrms ($\Delta SA3_T$ denotes third-order spherical aberration generated due to temperature change, $\Delta SA5_T$ denotes fifth-order spherical aberration generated due to temperature change, $\Delta SA7_T$ denotes seventh-order spherical aberration generated due to temperature change, $\Delta SA3_m$ denotes third-order spherical aberration generated due to change in objective incident magnification, $\Delta SA5_m$ denotes fifth-order spherical aberration generated due to change in objective incident magnification, and $\Delta SA7_m$ denotes seventh-order spherical aberration generated due to change in objective incident magnification.

3. The optical pickup according to claim 1 or 2, wherein the focal length f of the objective lens satisfies a relationship of 1.4 mm ≤ f ≤ 2.6 mm.

4. An optical disc apparatus comprising:
an optical pickup recording and/or reproducing an information signal with respect to an optical disc which is driven for rotation, the optical pickup including a light source emitting a light beam;
an objective lens condensing the light beam emitted from the light source onto the optical disc;
at least one divergent angle conversion lens disposed between the light source and the objective lens and changing a divergent angle of the light beam;
driving means for driving the at least one divergent angle conversion lens in a direction of an optical axis;
an optical detection device detecting a return light beam reflected at the optical disc; and
an environmental change detecting unit configured to detect change in environmental temperature,
wherein the objective lens is made of a refractive element having, on one surface thereof, a diffraction structure in a stepped shape or a blazed sectional shape, which generates diffraction light providing a spot adapted to perform satisfactory recording and/or reproducing, the objective lens satisfying a relationship of $2.5 \times 10^{-3} \leq \Delta WFA/(\Delta T \times f) \leq 2.6 \times 10^{-3}$ when first-order light is used, a relationship of $1.8 \times 10^{-3} \leq \Delta WFA/(\Delta T \times f) \leq 2.6 \times 10^{-3}$ when second-order light is used, a relationship of $1.1 \times 10^{-3} \leq \Delta WFA/(\Delta T \times f) \leq 2.6 \times 10^{-3}$ when third-order light is used, a relationship of $0.7 \times 10^{-3} \leq \Delta WFA/(\Delta T \times f) \leq 2.6 \times 10^{-3}$ when fourth-order light is used, and a relationship of $0.2 \times 10^{-3} \leq \Delta WFA/(\Delta T \times f) \leq 2.6 \times 10^{-3}$ when fifth-order light is used ($\Delta WFA$ denotes an amount of wavefront aberration of the objective lens corresponding to change in environmental temperature, $\Delta T$ denotes an amount of the change in environmental temperature, and f denotes a focal length of the objective lens), and wherein the at least one divergent angle conversion lens is driven step by step in accordance with a detection result of the environmental change detecting unit.

5. An optical pickup comprising:
a light source emitting a light beam;
an objective lens condensing the light beam emitted from the light source onto an optical disc;
at least one divergent angle conversion lens disposed between the light source and the objective lens and changing a divergent angle of the light beam;
a driving unit configured to drive the at least one divergent angle conversion lens in a direction of an optical axis;
an optical detection device detecting a return light beam reflected at the optical disc; and
an environmental change detecting unit configured to detect change in environmental temperature,
wherein the objective lens is made of a refractive element having, on one surface thereof, a diffraction structure in a stepped shape or a blazed sectional shape, which generates diffraction light providing a spot adapted to perform satisfactory recording and/or reproducing, the objective lens satisfying a relationship of $2.5 \times 10^{-3} \leq \Delta WFA/(\Delta T \times f) \leq 2.6 \times 10^{-3}$ when first-order light is used, a relationship of $1.8 \times 10^{-3} \leq \Delta WFA/(\Delta T \times f) \leq 2.6 \times 10^{-3}$ when second-order light is used, a relationship of $1.1 \times 10^{-3} \leq \Delta WFA/(\Delta T \times f) \leq 2.6 \times 10^{-3}$ when third-order light is used, a relationship of $0.7 \times 10^{-3} \leq \Delta WFA/(\Delta T \times f) \leq 2.6 \times 10^{-3}$ when fourth-order light is used, and a relationship of $0.2 \times 10^{-3} \leq \Delta WFA/(\Delta T \times f) \leq 2.6 \times 10^{-3}$ when fifth-order light is used ($\Delta WFA$ denotes an amount of wavefront aberration of the objective lens corresponding to change in environmental temperature, $\Delta T$ denotes an amount of the change in environmental temperature, and f denotes a focal length of the objective lens), and wherein the at least one divergent angle conversion lens is driven step by step in accordance with a detection result of the environmental change detecting unit.

6. An optical disc apparatus comprising:
an optical pickup recording and/or reproducing an information signal with respect to an optical disc which is driven for rotation, the optical pickup including a light source emitting a light beam;
an objective lens condensing the light beam emitted from the light source onto the optical disc;
at least one divergent angle conversion lens disposed between the light source and the objective lens and changing a divergent angle of the light beam;
a driving unit configured to drive the at least one divergent angle conversion lens in a direction of an optical axis;
an optical detection device detecting a return light beam reflected at the optical disc; and
an environmental change detecting unit configured to detect change in environmental temperature,
wherein the objective lens is made of a refractive element having, on one surface thereof, a diffraction structure in a stepped shape or a blazed sectional shape, which generates diffraction light providing a spot adapted to perform satisfactory recording and/or reproducing, the objective lens satisfying a relationship of $2.5 \times 10^{-3} \leq \Delta WFA/(\Delta T \times f) \leq 2.6 \times 10^{-3}$ when first-order light is used, a relationship of $1.8 \times 10^{-3} \leq \Delta WFA/(\Delta T \times f) \leq 2.6 \times$ $10^{-3}$ when second-order light is used, a relationship of $1.1 \times 10^{-3} \leq \Delta WFA/(\Delta T \times f) \leq 2.6 \times 10^{-3}$ when third-order light is used, a relationship of $0.7 \times 10^{-3} \leq \Delta WFA/(\Delta T \times f) \leq 2.6 \times 10^{-3}$ when fourth-order light is used, and a relationship of $0.2 \times 10^{-3} \leq \Delta WFA/(\Delta T \times f) \leq 2.6 \times 10^{-3}$ when fifth-order light is used ($\Delta WFA$ denotes an amount of wavefront aberration of the objective lens corresponding to change in environmental temperature, $\Delta T$ denotes an amount of the change in environmental temperature, and f denotes a focal length of the objective lens), and wherein the at least one divergent angle conversion lens is driven step by step in accordance with a detection result of the environmental change detecting unit.

* * * * *